US009317900B2

(12) United States Patent
Ichikawa

(10) Patent No.: US 9,317,900 B2
(45) Date of Patent: Apr. 19, 2016

(54) THREE-DIMENSIONAL IMAGE PROCESSING DEVICE, AND THREE-DIMENSIONAL IMAGE PROCESSING METHOD

(71) Applicant: Olympus Imaging Corp., Shibuya-ku, Tokyo (JP)

(72) Inventor: Manabu Ichikawa, Hachioji (JP)

(73) Assignee: OLYMPUS CORPORATION (JP)

( * ) Notice: Subject to any disclaimer, the term of this patent is extended or adjusted under 35 U.S.C. 154(b) by 70 days.

(21) Appl. No.: 13/790,887

(22) Filed: Mar. 8, 2013

(65) Prior Publication Data

US 2013/0230232 A1  Sep. 5, 2013

Related U.S. Application Data

(63) Continuation of application No. PCT/JP2012/060837, filed on Apr. 23, 2012.

(30) Foreign Application Priority Data

May 3, 2011 (JP) ................................. 2011-103331

(51) Int. Cl.
  *G06K 9/00* (2006.01)
  *G06T 5/00* (2006.01)
  *H04N 13/00* (2006.01)
  (Continued)

(52) U.S. Cl.
  CPC ................ *G06T 5/00* (2013.01); *H04N 5/2621* (2013.01); *H04N 13/0018* (2013.01); *H04N 13/026* (2013.01); *H04N 13/0221* (2013.01); *H04N 13/0239* (2013.01); *H04N 13/0033* (2013.01)

(58) Field of Classification Search
  None
  See application file for complete search history.

(56) References Cited

U.S. PATENT DOCUMENTS

| 6,445,833 | B1 | 9/2002 | Murata et al. |
| 7,010,158 | B2 * | 3/2006 | Cahill et al. ................... 382/154 |
| 7,567,648 | B2 * | 7/2009 | Tsubaki et al. ................. 378/41 |

(Continued)

FOREIGN PATENT DOCUMENTS

| CN | 101325678 A | 12/2008 |
| CN | 101542537 A | 9/2009 |

(Continued)

OTHER PUBLICATIONS

International Search Report issued in counterpart Japanese PCT Application No. PCT/JP2012/060837 dated Jul. 10, 2012.

*Primary Examiner* — Vikkram Bali
(74) *Attorney, Agent, or Firm* — Volpe and Koenig, P.C.

(57) ABSTRACT

A three-dimensional image processing device for visually applying a special effect by subjecting raw data that has been acquired by imaging to image processing, and creating image data capable of being viewed stereoscopically. The device comprises a tone conversion section for tone converting the raw data in accordance with the special effect, a three-dimensional image data processing section for carrying out at least one of clipping image data that has been tone converted by the tone conversion section as image data to be viewed stereoscopically, or carrying out geometric processing, to create three-dimensional image data, and a special effect image processing section for subjecting the three-dimensional image data to special image processing to apply a special effect that is analogous to an image that has been formed optically or formed by photographic film or by development and printing processing, and creating a three-dimensional special-effect image.

16 Claims, 18 Drawing Sheets

(51) Int. Cl.
*H04N 13/02* (2006.01)
*H04N 5/262* (2006.01)

(56) References Cited

U.S. PATENT DOCUMENTS

| | | | |
|---|---|---|---|
| 8,139,124 B2 * | 3/2012 | Nakamura | 348/231.2 |
| 8,213,711 B2 * | 7/2012 | Tam et al. | 382/162 |
| 8,345,952 B2 * | 1/2013 | Tsujimoto et al. | 382/154 |
| 8,547,417 B2 * | 10/2013 | Pan | 348/42 |
| 8,643,704 B2 * | 2/2014 | Neuman | 348/50 |
| 8,687,047 B2 * | 4/2014 | Hasegawa | 348/47 |
| 2008/0309782 A1 | 12/2008 | Nakamura et al. | |
| 2009/0027487 A1 * | 1/2009 | Misawa | 348/51 |
| 2010/0053378 A1 | 3/2010 | Toyoda et al. | |
| 2010/0290697 A1 | 11/2010 | Benitez et al. | |
| 2012/0176481 A1 * | 7/2012 | Lukk et al. | 348/47 |
| 2014/0098199 A1 * | 4/2014 | Yeatman et al. | 348/48 |

FOREIGN PATENT DOCUMENTS

| | | |
|---|---|---|
| CN | 101884222 A | 11/2010 |
| JP | 11008862 | 1/1999 |
| JP | 2005159755 A | 6/2005 |
| JP | 2010062836 A | 3/2010 |
| JP | 2010074244 A | 4/2010 |
| WO | 2009080449 A1 | 7/2009 |

* cited by examiner

FIG. 8

| FILTER NAME | EFFECT SUMMARY | CHROMA PARAMETER | GAMMA | SPECIAL EFFECT |
|---|---|---|---|---|
| FANTASTIC FOCUS (SOFT FOCUS) | SOFT FOCUS PROCESSING WITH BRIGHT CONTRAST OVERALL | STANDARD | GAMMA TO MAKE INTERMEDIATE BRIGHTNESS BRIGHTER | SOFT FOCUS |
| FANTASTIC FOCUS + STARLIGHT | FURTHER APPLICATION OF EFFECT TO FANTASTIC FOCUS TO GIVE APPEARANCE OF SHOOTING USING A CROSS FILTER | STANDARD | GAMMA TO MAKE INTERMEDIATE BRIGHTNESS BRIGHTER | SOFT FOCUS CROSS FILTER |
| FANTASTIC FOCUS + WHITE EDGE | APPLICATION OF AFFECT TO GRADUALLY WHITEN THE PERIPHERY, TO FANTASTIC FOCUS | STANDARD | GAMMA TO MAKE INTERMEDIATE BRIGHTNESS BRIGHTER | SOFT FOCUS PERIPHERAL BRIGHTENING |
| POP ART (POP ART) | HIGH CHROMA WITH HIGH CONTRAST OVERALL | HIGH CHROMA | GAMMA TO ENHANCE CONTRAST | NONE |
| POP ART + STARLIGHT | FURTHER APPLICATION OF EFFECT TO POP ART TO GIVE APPEARANCE OF SHOOTING USING A CROSS FILTER | HIGH CHROMA | GAMMA TO ENHANCE CONTRAST | CROSS FILTER |
| POP ART + PINHOLE | FURTHER ADDITION OF SHADING TO POP ART | HIGH CHROMA | GAMMA TO ENHANCE CONTRAST | SHADING |
| POP ART + WHITE EDGE | FURTHER APPLICATION OF AFFECT TO GRADUALLY WIDENED PERIPHERY TO POP ART | HIGH CHROMA | GAMMA TO ENHANCE CONTRAST | PERIPHERAL BRIGHTENING |
| TOY PHOTO (PIN HOLE) | CHANGING OF WHITE BALANCE AND APPLICATION OF SHADING EFFECT TO IMAGE WITH A TINGE | STANDARD | STANDARD | SHADING |
| ROUGH MONOCHROME (GRAINY FILM) | ADDITION OF NOISE TO A MONOCHROME IMAGE AND ALSO MAKING HIGH CONTRAST | MONOCHROME | GAMMA TO ENHANCE CONTRAST | NOISE ADDITION |
| DIORAMA (DIORAMA) | APPLICATION OF PROCESSING TO FEATHER PERIPHERY OF IMAGE, TO IMAGE HAVING HIGH CONTRAST AND HIGH CHROMA | HIGH CHROMA | GAMMA TO ENHANCE CONTRAST | MINIATURE EFFECT |

----- RGB gamma (other)   ——— RGB gamma (pop art)

----- Y gamma (other)   ——— Y gamma (contrast enhancement)   —·— Y gamma (intermediate boost)

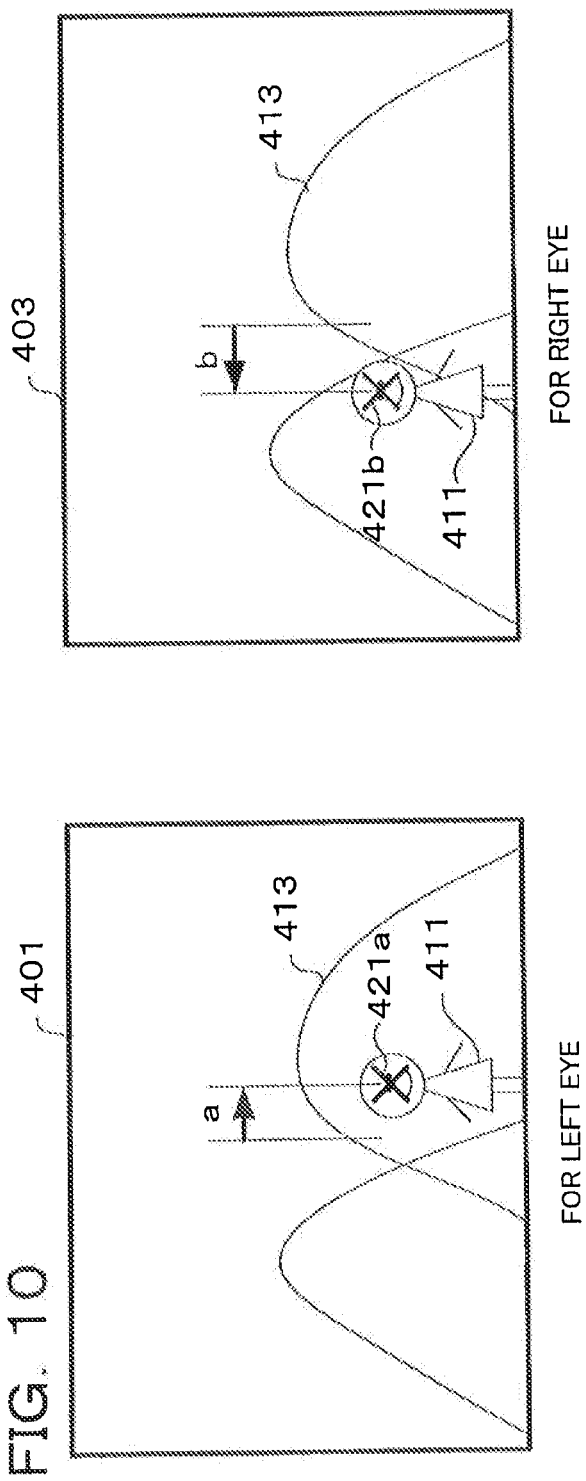

THREE-DIMENSIONAL IMAGE PROCESSING DEVICE, AND THREE-DIMENSIONAL IMAGE PROCESSING METHOD

This application is a continuation of International Application No. PCT/JP/060837, and claims the benefit to the filing date of prior Japanese Patent Application No. 2011-103331 filed on May 3, 2011, both of which are incorporated by reference as if fully set forth. The scope of the present invention is not limited to any requirements of the specific embodiments described in the applications.

BACKGROUND OF THE INVENTION

1. Field of the Invention

The present invention relates to a three-dimensional image-processing device for creating an image that has been simultaneously subjected to three-dimensional image and special image processing, and to a three-dimensional image processing method.

2. Description of the Related Art

An imaging device such as a digital camera may have a function to shoot a stereoscopic three-dimensional image (three-dimensional image) using a plurality of images. For example, Japanese patent number 2951291 discloses a device and method for converting a two dimensional image to a three dimensional image by calculating an image feature amount relating to perspective of a video for every parallax computing region, carrying out group division for every object contained on a screen based on this amount, generating information relating to perspective of a video of each group based on the result of group division and image feature amount, and converting to parallax information. Shooting devices for shooting a three-dimensional image using a two-pupil camera and dedicated lens are also known.

On the other hand, there have also been various proposals to create image data that has been subjected to special effects using raw data that was acquired by imaging. For example, an image processing device that is capable of applying special effects to generate a high contrast image having a grainy impression (noise) such as with film is disclosed in Japanese patent laid open number 2010-62836. Also, Japanese patent laid open number 2010-74244 discloses an image processing device having an art filter function that can create an image that has been subjected to various special effects, such as a special effect to generate an image that has faded edges, a special-effect to generate an image that has high chroma and contrast and has part of the image shaded, a special effect to create an image that appears to have been taken with low contrast and soft focus, or a special effect to draw a pattern such as crosses on light sources.

SUMMARY OF THE INVENTION

An object of the present invention is to provide a three-dimensional image processing device and three-dimensional image processing method that can make a three-dimensional image that has been subjected to special effects appear natural without being unpleasant. It is also an object to provide a three-dimensional image processing device and three-dimensional image processing method that can create a three-dimensional image without causing a significant increase in the processing time and memory required.

A three-dimensional image processing device of the present invention comprises an image processing device for visually applying a special effect by subjecting raw data that has been acquired by imaging to image processing, and creating image data that is capable of being viewed stereoscopically, a tone conversion section for converting the raw data to tones, a three-dimensional image data processing section for carrying out at least one of clipping image data that has been tone converted by the tone conversion section as image data to be viewed stereoscopically, or carrying out geometric processing, to create three-dimensional image data, and a special effect image processing section for subjecting the three-dimensional image data created by the three-dimensional image data processing section to special image processing to apply a special effect that is analogous to an image that has been formed optically, or a special effect that is analogous to an image formed by photographic film or by development and printing processing, and creating a three-dimensional special-effect image.

Also, a three-dimensional image processing method of the present invention comprises an image processing method for visually expressing a special effect by subjecting raw data that has been acquired by imaging to image processing, and creating image data that is capable of being viewed stereoscopically, wherein the raw data is tone converted, at least one of clipping image data that has been tone converted by the tone conversion section as image data to be viewed stereoscopically, or geometric processing, is carried out, to create three dimensional image data, and the three-dimensional image data is subjected to special image processing to apply a special effect that is analogous to an image that has been formed optically, or a special effect that is analogous to an image formed by photographic film or by development and printing processing, and creating a three-dimensional special-effect image.

BRIEF DESCRIPTION OF THE DRAWINGS

FIG. 8 is a table showing a relationship between effect summary, chroma parameter, gamma, and processing content for each special effect, in the camera of the first embodiment of the present invention.

FIG. 10 is a diagram for describing positions for special image processing in the camera of the first embodiment of the present invention.

DETAILED DESCRIPTION OF THE PREFERRED EMBODIMENTS

Preferred embodiments using a camera to which the present invention has been applied will be described in the following in accordance with the drawings. A camera of one embodiment of the present invention is a digital camera, and has an imaging section such as an image sensor 103, with a subject image being converted to image data by this imaging section, and the subject image then being subjected to live view display on a display section constituted by an LCD 135 arranged on a rear surface of a main body based on this converted image data. A photographer determines composition and photo opportunity by looking at the live view display. At the time of a release operation image data is stored in a storage medium 131.

Also, in the case where 3-D shooting mode has been set, after shooting at a first position if shooting is performed at a second position the camera creates a three-dimensional image (3-D image) and stores in the storage medium. Also, if setting of a special effect (art filter: registered trademark) is carried out by operation of the operation section 123, image data is image processed with the set special effect, the special effect image is subjected to live view display, and also stored in the storage medium 131.

Figure 1:
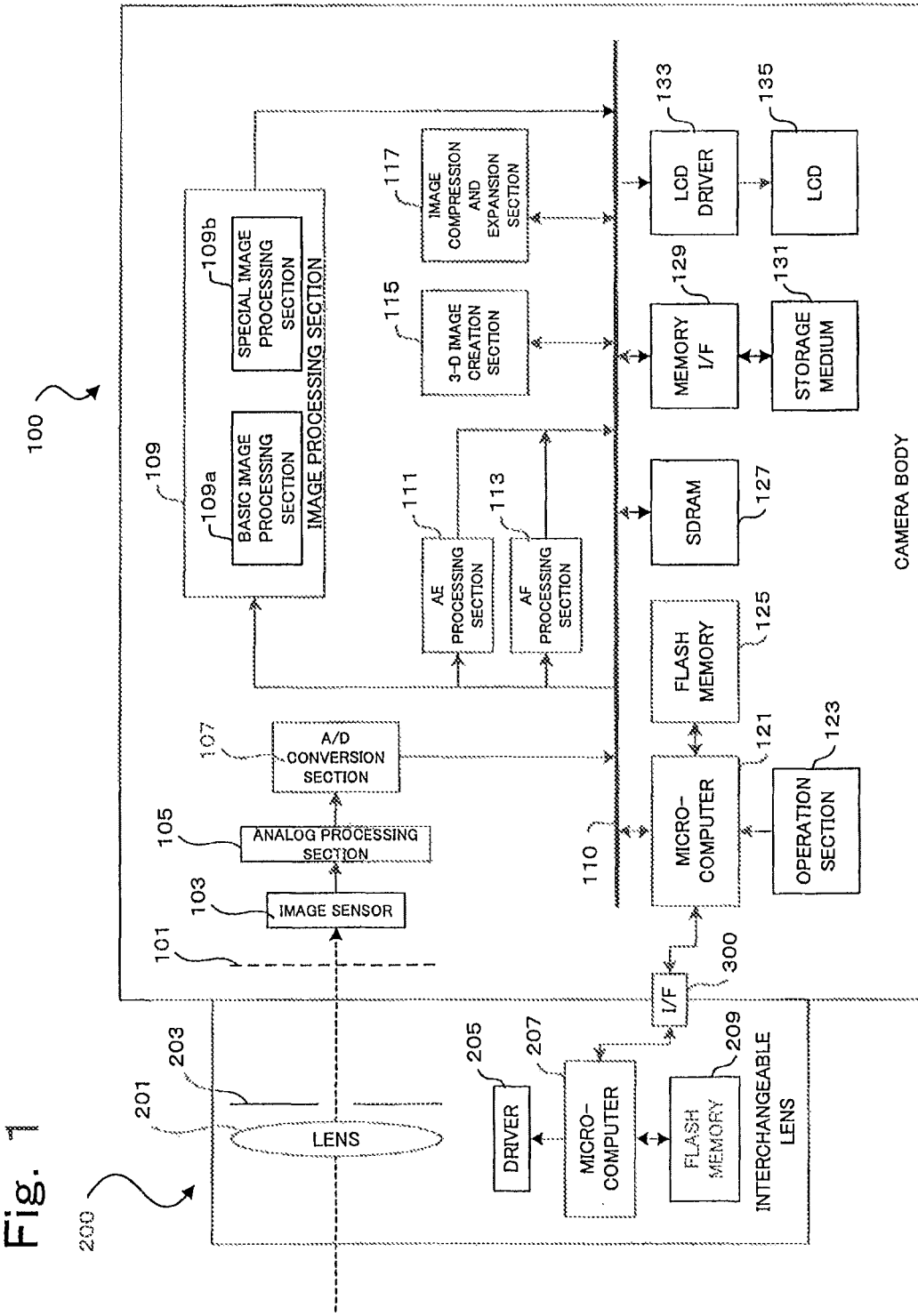
FIG. 1 is a block diagram mainly showing the overall structure of electrical systems of a camera of a first embodiment of the present invention.

FIG. 1 is a block diagram mainly showing the electrical structure of a camera of a first embodiment of the present invention. This camera comprises a camera body 100 and an interchangeable lens 200 that can be attached to and removed from the camera body. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 300 between the interchangeable lens 200 and the camera body 100, which will be described later.

The photographing lens 201 is constituted by a plurality of optical lenses for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201. Also, the photographing lens 201 is capable of being moved in the optical axis direction by the driver 205, with focus position of the photographing lens 201 being controlled based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 300 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

Besides the previously described program, various data such as optical characteristics of the interchangeable lens 200 and adjustment values are stored in the flash memory 209. The I/F 300 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 is not limited to a Bayer array, and various types such as Foveon (Registered trademark), for example, can also be used.

The image sensor 103 is connected to an analog processing section 105, and the analog processing section 105 performs wave shaping on the photoelectric conversion signals (analog image signals) that have been read out from the image sensor 103 after reducing reset noise etc., and also carries out gain increase so as to achieve an appropriate brightness. The analog processing section 105 is connected to an A/D conversion section 107, and this A/D conversion section 107 performs analog to digital conversion on the analog image signals, and outputs the digital image signals (hereafter referred to as image data) to a bus 110. In this application, raw image data generated before image processing in the image processing section 109 is called RAW data. In the case where 3-D shooting mode has been set, two or more RAW data are acquired for 3-D image creation.

The bus 110 is a transfer path for transferring various data, that has been read out or generated inside the camera body 100, within the camera body 100. Besides the previously described A/D conversion section 107, an image processing section 109, AE (AutoExposure) processing section 111, AF (AutoFocus) processing section 113, 3-D image creation section 115, image compression and expansion section 117, the microcomputer 121, an SDRAM (synchronous DRAM) 127, memory interface (hereafter referred to as memory I/F) 129, and liquid crystal (hereafter referred to as LCD) driver 133 are connected to the bus 110.

The image processing section 109 has a basic image processing section 109a for carrying out basic image processing, and a special image processing section 109b for applying special effects in the case where art filter has been set. The basic image processing section 109a performs optical black (OB) subtraction processing, white balance (WB) correction, demosaicing processing in the case of Bayer data, gamma/color reproduction processing, color matrix computation, noise reduction (NR) processing, edge enhancement processing etc. on the RAW data. The basic image processing section 109a also functions as a tone conversion section for carrying out gamma correction (tone conversion) in accordance with a special effect (art filter), for the gamma/color reproduction processing. Processing is also carried out in accordance with a special effect in the color reproduction processing (color correction, chroma correction).

The special image processing section 109b also carries out special image processing to create various visual special effects such as adding shading, adding feathering, adding soft focus, adding noise, adding a cross filter effect etc. according to the special effect that has been set. In order to carry out the various image processing, the image processing section 109 reads out image data that has been temporarily stored in the SDRAM 127, applies image processing to this image data, and outputs the image data that has been subjected to the image processing to the bus 110. The special image processing section 109b functions as a special effect image processing section for processing a special effect image to apply a special effect analogous to an image that has been formed optically, or a special effect analogous to an image that has been formed with photographic film and development and printing processing, on three-dimensional image data that has been created by the 3-D image creation section 115 functioning as a three-dimensional image data processing section, and creating a three-dimensional special-effect image.

The AE processing section 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing section 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method.

The 3-D image creation section 115 creates 3-D image data (also called three-dimensional image data) using a plurality of images. With this embodiment, 3-D image data is created using two images, namely an image taken at a first position (for example, for the left eye) and an image taken at a second position (for example, for the right eye). This 3-D image creation section 115 functions as a three-dimensional image data processing section for carrying processing for either cutting out image data that has been tone converted by the basic image processing section 109a functioning as a tone conversion section as image data to be viewed stereoscopically, or applying a geometric transformation such as rotation correction or trapezoidal correction, and creating three-dimensional image data.

At the time of storage of image data to the storage medium 131, the image compression and expansion section 117 subjects image data that has been read out from the SDRAM 127 to compression in accordance with various compression formats such as JPEG compression in the case of a still picture or MPEG in the case of a movie. The microcomputer 121 attaches a header necessary for configuring a JPEG file or an MPO file or MPEG file to the JPEG image data or MPEG image data, to create a JPEG file or an MPO file or MPEG file, and stores the created file in the storage medium 131 via the memory I/F 129.

The image compression and expansion section 117 also carries out expansion of JPEG image data and MPEG image data for image playback display. In the expansion, a file that is stored in the storage medium 131 is read out, and after being subjected to expansion processing in the image compression and expansion section 117 the expanded image data is temporarily stored in the SDRAM 127. With this embodiment, the JPEG compression system and MPEG compression system are adopted as the image compression system, but the compression system is not limited to this and another compression system may be used, such as TIFF, H.264 etc.

The microcomputer 121 provides a function as a control section for this entire camera, and performs overall control of various sequences of the camera. Besides the previously described I/F 300, an operation section 123 and a flash memory 125 are connected to the microcomputer 121.

The operation section 123 includes operation members such as various input buttons, like a power supply button, release button, a movie button, playback button, menu button, cross key button, and OK button, and various input keys, and detects operating states of these operation members and outputs the result of detection to the microcomputer 121. The microcomputer 121 executes various sequences according to user operation based on the result of detection of the operation members from the operation section 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The playback button is an operation button for setting and canceling playback mode settings, and if playback mode is set image data of a taken image is read out from the storage medium 131, and a taken image is playback displayed on the LCD 135.

The menu button is an operation button for causing display of menu screens on the LCD 135. It is possible to carry out various camera settings on the menu screens. As a camera setting there is setting for special effects (art filter). Various special effects can be set as a special effect, such as fantastic focus, pop art, pin hole, grainy film, Dioramatic tone etc. (refer to FIG. 8 which will be described later).

The flash memory 125 stores a program for executing the various sequences of the microcomputer 121. The microcomputer 121 carries out overall control of the camera based on this program. The flash memory 125 also stores various adjustment values such as a color matrix coefficient, R gain and B gain corresponding to white balance mode, a gamma table, an exposure condition determination table etc. These coefficients store a different value depending on the set special effects (arts filter).

The SDRAM 127 is an electrically rewritable volatile memory for temporary storage of image data etc. This SDRAM 127 temporarily stores image data that has been output from the A/D conversion section 107, and image data that has been processed in the image processing section 109 and image compression and expansion section 117 etc.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100.

The LCD driver 133 is connected to the LCD 135, and reads out from the SDRAM 127 and storage medium 131 to display an image on the LCD 135 based on image data that has been expanded by the image compression and expansion section 117. The LCD 135 includes a liquid crystal panel on the rear surface or the like of the camera body 100, and performs image display. As image display modes, there are Quickview Display for displaying stored image data for only a short time, playback display of image files for still images and movies that have been stored in the storage medium 131, and movie display such as live view display. The display section is not limited to an LCD, and other display panels such as organic EL may also be adopted.

Next, main processing of the camera of this embodiment will be described using the flowcharts shown in FIG. 2 and FIG. 3. Processing related to movie shooting has been omitted from this main flow. The flowchart shown in FIG. 2 to FIG. 6 is executed by the microcomputer 121 in accordance with programs stored in the flash memory 125.

Figure 2:
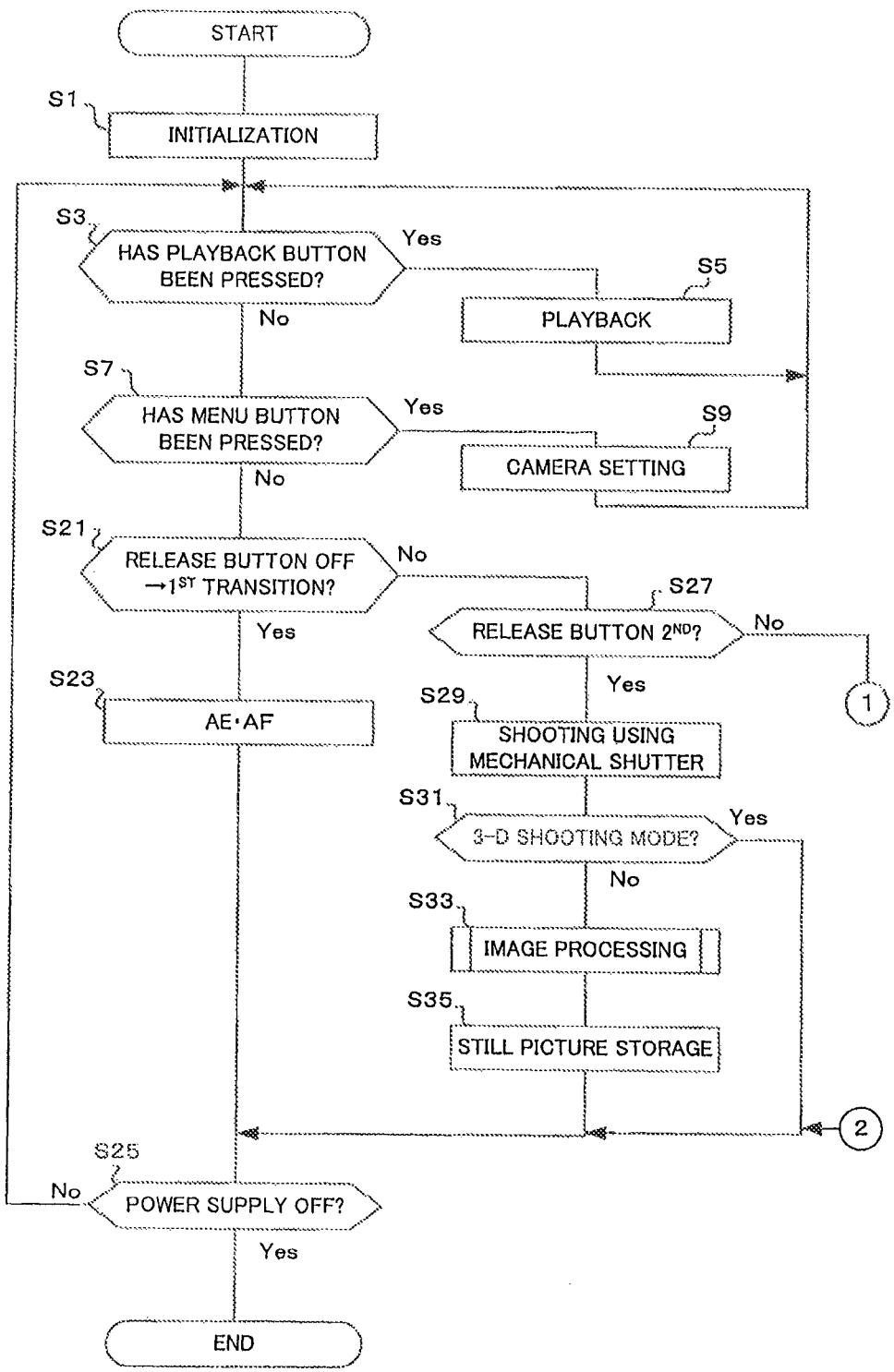
FIG. 2 is a flowchart showing main flow of a camera of a first embodiment of the present invention.
Figure 3:
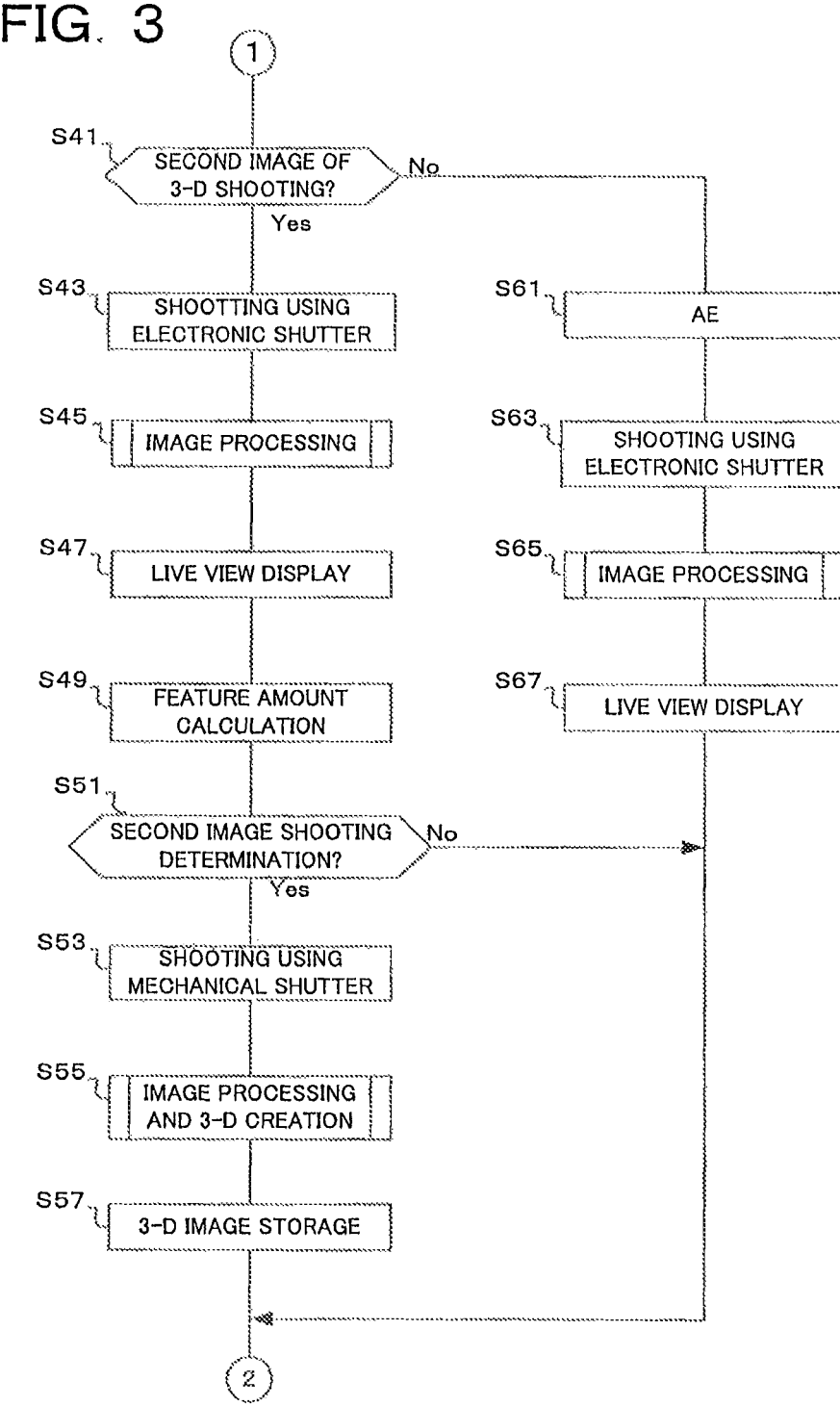
FIG. 3 is a flowchart showing main flow of a camera of a first embodiment of the present invention.

If the power supply button within the operation section 123 is operated and the power supply is turned on, operation of the main flow shown in FIG. 2 is started. Once operation is commenced, initialization is first executed (S1). As part of the initialization, mechanical initialization and electrical initialization, such as initialization of various flags etc., are carried out.

Once initialization has been carried out, it is next determined whether or not the playback button has been pressed (S3). Here, determination is carried out by detecting the operating state of the playback button within the operation section 123. If the result of this determination is that the playback button has been pressed, playback mode is executed (S5). Here, image data is read out from the storage medium 131, and a list of still images and movies is displayed on the LCD 135. The user selects an image from within the list by operating the cross shaped button and confirms the image using the OK button. Once playback is complete, processing returns to step S3.

If the result of determination in step S3 was that the playback button was not pressed, it is next determined whether or not the menu button has been operated (S7). Here, determination is carried out by detecting the operating state of the menu button within the operation section 123.

If the result of determination in step S7 is that the menu button has been pressed, camera setting is carried out (S9). As described previously, it is possible to carry out various camera settings on the menu screens. As camera settings, there are various shooting modes such as 3-D shooting mode, and as finished effects for an image there are special effects to give an image a natural appearance (natural), make a vibrant image (vivid), make a cool image (flat), or art filter etc. (refer to FIG. 8). There are also still picture storage modes such as JPEG storage, JPEG+RAW storage, and RAW storage, and settings for movie storage mode such as Motion—JPEG, H.264 etc. Once, setting has been carried out, processing returns to step S3.

If the result of determination in step S9 is that the menu button has not been pressed, it is next determined whether or not the release button has been pressed down half way, in other words, whether or not the first release switch has changed from off to on (S21). For this determination, the state of the first release switch that is linked to the release button is detected by the operation section 123, and determination is carried out based on the result of detection. If the result of detection is that the first release switch has changed from off to on, the result of determination becomes Yes, while on the other hand if an on state or an off state is maintained the result of determination becomes No.

If the result of determination in step S21 is that the release button has been pressed down half way, then in the case where the first release has transitioned from off, an AE/AF operation is executed (S23). Here, the AE processing section 111 detects subject brightness based on image data acquired by the image sensor 103, and calculates shutter speed and aperture value etc. for correct exposure based on this subject brightness.

Here, the driver 205 moves focus position of the photographing lens 201 by means of the microcomputer 207 inside the interchangeable lens 200 so that a focus evaluation value that has been acquired by the AF processing section 113 becomes a peak value. As a result, if the release button is pressed down halfway when movie shooting is not being carried out, focusing of the photographing lens 201 is carried out at that point in time.

If the result of determination in step S21 is that the release button has not transitioned from off to the first release, it is next determined whether or not the release button has been pressed down fully, and the second release switch has been turned on (S27). In this step, the state of the second release switch that is linked to the release button is detected by the operation section 123, and determination is carried out based on the result of detection.

If the result of determination in step S27 is that the release button is pressed down fully and that the second release which has been turned on, still image shooting is carried out using the mechanical shutter (S29). Here, the diaphragm 203 is controlled by the aperture value that was calculated in step S23, and the shutter speed of the mechanical shutter 101 is controlled by the calculated shutter speed. Then, once the exposure time corresponding to the shutter speed has elapsed, image signals are read from the image sensor 103, and image data that has been processed by the analog processing section 105 and the A/D conversion section 107 is output to the bus 110.

If shooting using the mechanical shutter has been carried out, it is next determined whether or not the shooting mode is 3-D shooting mode (S31). As described previously, 3-D shooting mode is set on a menu screen, and so determination is carried out based on the setting state for shooting mode.

If the result of determination in step S31 is that it is not 3-D shooting mode, next image processing is carried out (S33), and still picture storage is carried out (S35). In the event that 3-D shooting mode has been set, it is necessary to carry out image processing and still picture storage after shooting a second image at the second position. On the other hand, if 3-D shooting mode has not been set it is not necessary to take a second image and image processing and still picture storage are carried out immediately. Detailed operation of the image processing of step S33 will be described later using FIG. 4.

If the result of determination in step S27 is that the release button has not been pressed down fully, it is next determined whether or not it is a 3-D shooting second image (refer to S41 and FIG. 3). Here 3-D shooting mode has been set, and it is determined whether or not the shooting of the first image at the first position in previously described step S29 has been completed.

If the result of determination in step S41 is that it is the second image for 3-D shooting, shooting using an electronic shutter is next carried out (S43). The actual shooting of a second image for 3-D shooting is carried out in step S53 which will described later, but before that, for determining whether or not the second position where the second image will be shot has been reached, the image is analyzed and camera movement amount is measured. Then, in step S43, image data is acquired using an electronic shutter of the image sensor 103, in order to acquire an image for movement amount analysis. Shooting at this time is carried out in accordance with exposure conditions that were determined in step S23.

Once shooting using the electronic shutter has been carried out, image processing is carried out (S45). Here, image processing similar to that in step S33 is carried out on the acquired image data. Detailed operation of the image processing of step S45 will be described later using FIG. 4. However, in the flow of FIG. 4, steps S85-S89 are for special image processing, and so will be omitted.

If image processing has been carried out, live view display is next carried out (S47). With this embodiment, if 3-D shooting mode is set and shooting of the first image at the first position has been carried out, the photographer moves the camera to a second position, and once the second position has been reached shoots a second image at that position. Live view display is also carried out after shooting of the first image so as to make it easy to move to the second position. Live view display is displaying of a movie of the subject image on the LCD 135 based on image data that has been acquired by the image sensor 103.

If live view display has been carried out, calculation of feature amount is next carried out (S49). Here, featured amounts such as edge components and color components are detected from the first taken image that was acquired in step S29 and the live view image that was acquired in step S43, and camera movement amount is calculated. It is also possible to display the shooting position of the second image (second position) overlaid on the live view display, based on the movement amount of the camera that has been calculated here. This is convenient for the photographer.

Once feature amount calculation has been carried out, determination of the second taken image is carried out (S51). Here it is determined whether or not there has been movement of the camera by a parallax amount to the left or right, based on the calculated camera movement amount. If the result of this determination is that the camera has not moved to the shooting position for the second image, processing advances to step S25, processing in the order S3→S7→S21→S27→S41→S43 is executed, and once again shooting is carried out, feature amount is calculated, and determination of the second image is carried out.

If the result of determination in step S51 is that the position before shooting the second image has been reached, the second image is taken using the mechanical shutter (S53). It is preferable for the exposure conditions at the time of shooting the second image to be the same conditions as for when shooting the first image in step S29. This is in order to prevent an unnatural image due to differences in brightness.

If shooting of the second image using the mechanical shutter has been carried out, image processing and 3-D creation are carried out (S55). Here, the creation of a 3-D image that has had a special effect (art filter) applied is carried out. The details will be described using the flowchart shown in FIG. 6, but basically, after carrying out basic image processing such as gamma conversion (tone conversion) and chroma etc. in accordance with the special effect, 3-D image data is created, and image processing required for the special effect is further applied to the generated 3-D image to create the final 3-D image data.

If image processing and 3-D creation has been carried out, 3-D image storage is next carried out (S57). Here, left and right stereo images that were created in step S55 are subjected to JPEG compression in the image compression and expansion section 117 to create an MPO (Multi-Picture Object) file, and this created file is stored in the storage medium 131. At this time, data that can specify what image processing was carried out at the time of creating the 3-D image etc. is stored in a header portion of the main image and subsidiary image. In this way it is possible to ascertain the special effect processing from the image data. It is also possible to display the created 3-D image on the LCD 135 for a specified period of time.

If the result of determination in step S41 is that it is not the second image for 3-D shooting, AE is next carried out (S61). In the case of carrying out the processing of step S61 by way of from step S21 to S27 and S41, it is a situation where no operation was carried out for the release button, and in this case live view display of step S67, which will described later, is carried out. In step S61, exposure control is carried out in order to carry out live view display. Specifically, shutter speed and ISO sensitivity for the electronic shutter of the image sensor 103 in order to carry out live view display at the correct exposure are calculated.

Once AE has been carried out, shooting using the electronic shutter is carried out (S63). Here image data is acquired using the electronic shutter of the image sensor 103. Next, image processing is carried out on the acquired image data (S65). The image processing here is for live view display, and in the case where a special effect has been set, image processing in accordance with the set special effect is also carried out. Detailed operation of this image processing will be described later using FIG. 4.

If image processing has been carried out, live view display on the LCD 135 is next carried out (S67). Image data is acquired in step S63, and image processing is carried out in step S65, and so in this step update of the live view display is carried out. A photographer can determine composition and when to take the shot by observing the live view display.

If live view display has been carried out in step S67, if the result of determination in step S51 was that it was not shooting of a second image, if 3-D image storage has been carried out in step S57, if the result of determination in step S31 was that it was 3-D shooting mode, if still picture storage was carried out in step S35, or if AE/AF was carried out in step S23, it is next determined whether or not the power supply is off (S25). In this step it is determined whether or not the power supply button of the operation section 123 has been pressed again. If the result of this determination is that the power supply is not off, processing returns to step S3. On the other hand if the result of determination is that the power supply is off, a termination operation of the main flow is executed and then the main flow is terminated.

In this manner, in the main flow of the first embodiment of the present invention, in the case where 3-D shooting mode has been set, if the release button is pressed down fully shooting of a first image is carried out at a first position (refer to S29), the photographer moves the camera, and once a second position has been reached shooting of a second image is carried out (refer to S53). In the case where a special effect (art filter) has been set together with 3-D shooting mode, then after completion of shooting of the second image, image processing and 3-D creation are carried out (refer to S55), and a 3-D image to which the special effect has been applied is created and stored.

Figure 4:
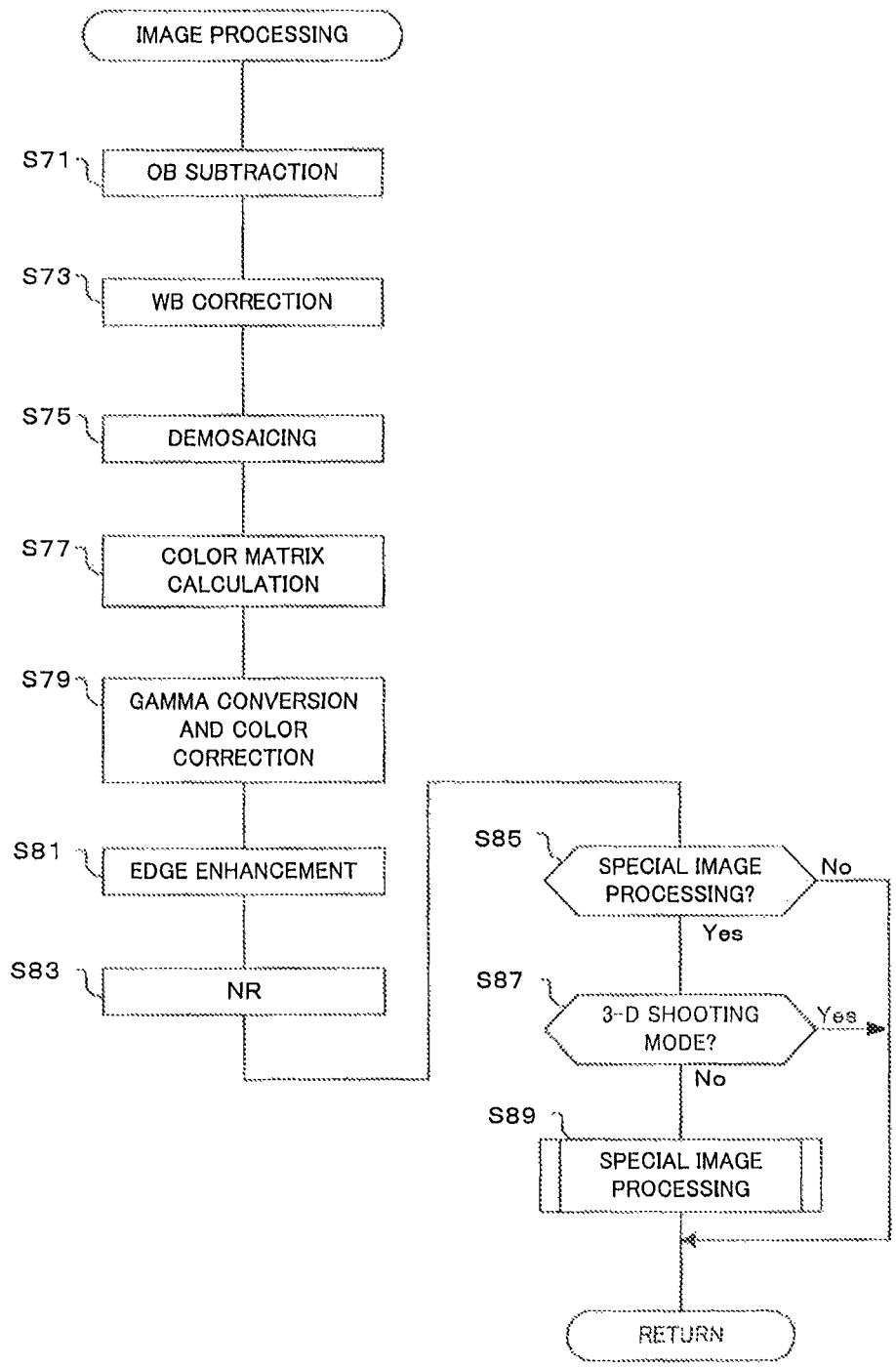
FIG. 4 is a flowchart showing operation of image processing for the camera of the first embodiment of the present invention.

Next, the image processing of steps S33, S45 and S65 will be described using the flowchart shown in FIG. 4. If the image processing flow is entered, first optical black (OB) calculation is carried out (S71). In this step, an optical black value, which is ascribable to dark current etc. of the image sensor 103, is respectively subtracted from a pixel value of each pixel constituting the image data by an OB calculation section within the basic image processing section 109a.

If OB calculation has been carried out, white balance (WB) correction is next carried out (S73). In this step, white balance correction is carried out for the image data by a WB correction section within the basic image processing section 109a, in accordance with the set white balance mode. Specifically, correction is carried out by reading out R gain and B gain corresponding to the white balance mode set by the user from the flash memory 125 of the camera body, and multiplying the image data of the Bayer array by these values. Alternatively, in the case of auto white balance, R gain and B gain are calculated from RAW data, and correction is carried out using these values.

Next, demosaicing processing is carried out (S75). In this step, image data that has been subjected to white balance correction is converted to data having each pixel made up of RGB data by a demosaicing processing section within the basic image processing section 109a. Specifically, data not at that pixel position is obtained by interpolation from around that pixel position, and converted to RGB data.

Once demosaicing processing has been carried out, color matrix calculation is carried out (S77). In this step, a linear transformation to multiply the image data by a color matrix coefficient according to the set white balance mode is carried out by a color matrix calculating section within the basic image processing section 109a, to correct the color of the image data. The color matrix coefficient is stored in the flash memory 125, and so it is read out and used.

Once color matrix calculation has been carried out, a gamma transformation is carried out (S79). In this step a gamma table stored in the flash memory 125 is read out by a gamma processing section within the basic image processing section 109a, and gamma correction processing is carried out on the image data. The gamma table has values designed in accordance with finished effect settings stored in the flash memory 125. Gamma correction involves RGB gamma appropriate to the RGB data, and Y gamma appropriate to a brightness component (Y) obtained by color space conversion of RGB data to brightness and color difference components (for example Y and Cb/Cr). With respect to the color space, conversion is possible using reciprocal computation.

Figure 9A:
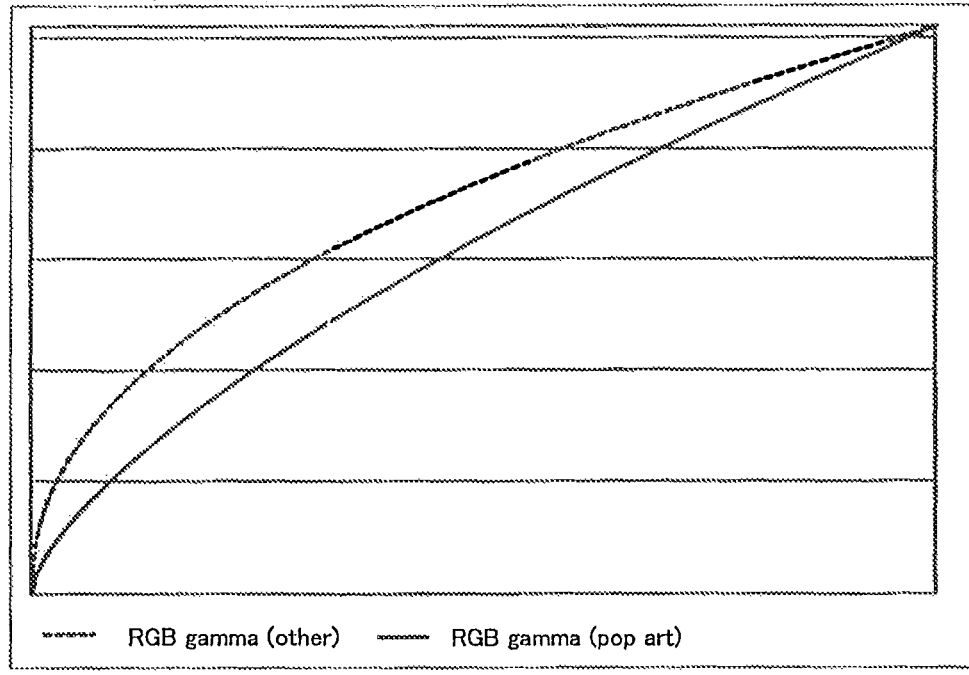
FIGS. 9(*a*) and 9(*b*) are graphs showing gamma values appropriate to special effects, for the camera of the first embodiment of the present invention.
Figure 9B:
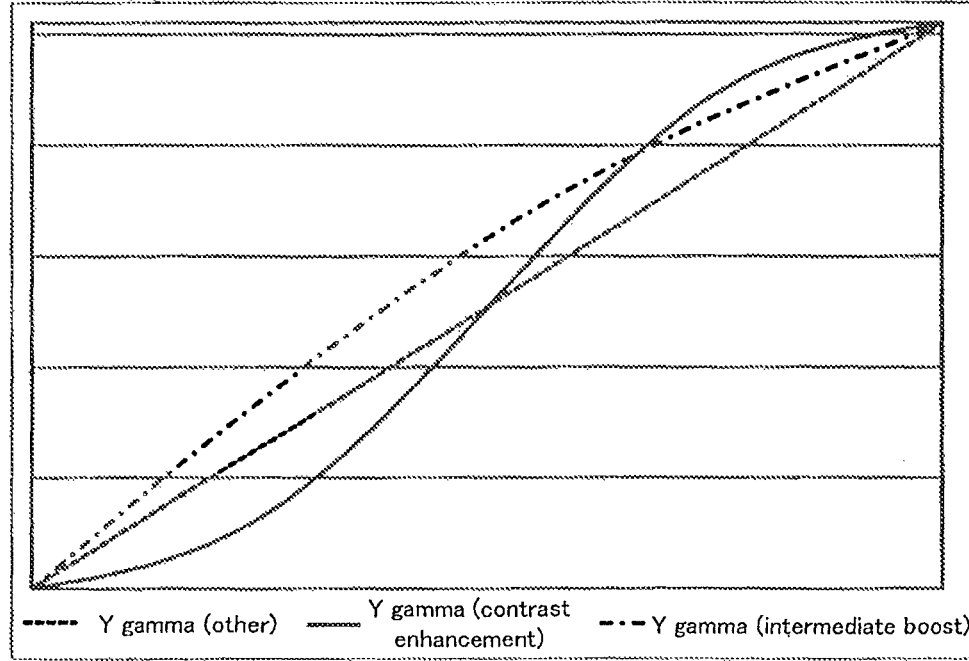

As described previously, it is possible to set a special effect (art filter) on a menu screen. An effect summary, chroma parameter, gamma, and special effect for the set art filters are shown in FIG. 8. Also, a gamma table appropriate to the set special effect is shown in FIGS. 9(a) and 9(b). Here, FIG. 9(a) is a drawing showing the case applied to RGB data, showing, for example, one example of gamma values in the case of pop art processing (RGB gamma (pop art) of FIG. 9(a)), and in the case of other (RGB gamma (other) of FIG. 9(a)) processing. Also, FIG. 9(b) is a drawing showing the case applied to Y data, showing, for example, one example of values for a case of enhanced contrast (Y gamma (contrast enhancement) of FIG. 9(b)), as shown in FIG. 8, a case of making brighter using intermediate brightness (Y gamma (intermediate boost)) of FIG. 9(b)), and gamma for another standard case (Y gamma (other) of FIG. 9(b)). The gamma correction processing carried out in step S79 is carried out using gamma values determined in accordance with a special effect (art filter) that has been set, or, in the event that a special effect has not been set, using standard gamma values. Specifically, gamma correction processing is carried out in accordance with values that have been designed according to finished effect settings.

Also, in step S79, chroma and hue correction processing is carried out by a color reproduction processing section within the basic image processing section 109a. This correction processing is carried out using a chroma parameter that is designed in advance in accordance with finished effects settings. Specifically, chroma and hue correction processing is carried out in accordance with a chroma parameter shown in FIG. 8 determined depending on the special effect (art filter) that has been set. With this processing there is a conversion from RGB to YCbCr.

Once gamma conversion and color correction have been carried out, edge enhancement is carried out (S81). In this step, an edge enhancement processing section within the basic image processing section 109a enhances edges of the image data, by extracting edge components for image data that has been subjected to a gamma correction and color correction using a band pass filter, multiplying by a coefficient corresponding to a degree of edge enhancement, and adding to the image data.

Next, NR (noise reduction) is carried out (S83). In this step an image is subjected to frequency analysis, and processing is carried out to reduce noise in accordance with frequency.

If NR processing has been carried out, it is next determined whether or not there is special image processing (S85). As described previously, since setting for special effects (art filter) is carried out on a menu screen, in this step determination is based on setting on the menu screen.

If the result of determination in step S85 is that special image processing has been performed, it is next determined whether or not 3-D shooting mode has been set (S87). Since 3-D shooting mode is also set on a menu screen, in this step determination is based on setting on the menu screen.

If the result of determination in step S87 is that 3-D shooting mode has not been set, special image processing is carried out (S89). Within the special image processing, processing related to gamma conversion and color correction is carried out in step S79, and other processing such as cross filter processing, soft focus processing etc. is carried out by required special image processing in accordance with the special effect (art filter) that has been set. If live view display is in progress, an image that has been subjected to special image processing in accordance with the special effect that has been set is subjected to live view display, and in the case of normal still picture shooting an image to which special image processing has been applied is stored. Detailed operation of this special image processing will be described later using FIG. 5. In the case where both special image processing and 3-D image mode have been set, image processing is carried out after the shooting of two images has been performed (refer to S55 and FIG. 6).

If the special image processing of step S89 has been carried out, if the result of determination in step S85 was not special image processing, or if the result of determination in step S87 was 3-D shooting mode, the original processing flow is returned to.

In this way, in the image processing flow of this embodiment, common image processing that is not related to various special image processing such as OB subtraction etc. is executed, and at the time of gamma conversion and color correction, correction processing in accordance with a set special effect is carried out by the basic image processing section 109a. Further, unless 3-D shooting mode has been set, special image processing is carried out in conjunction with the special image processing section 109b.

Figure 5:
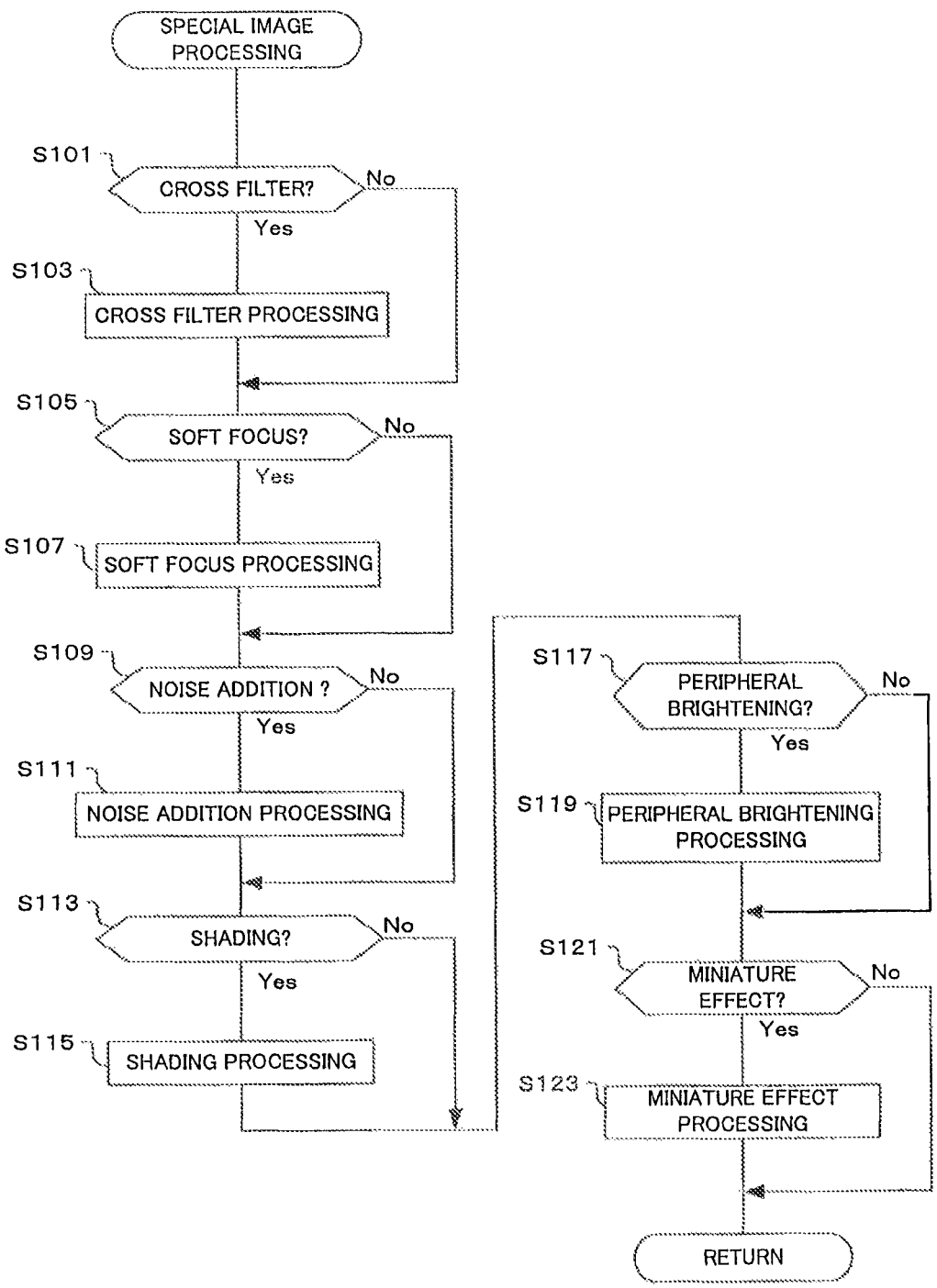
FIG. 5 is a flowchart showing operation of special image processing for the camera of the first embodiment of the present invention.

Next, the special image processing in step S89 (refer to FIG. 4) will be described using the flowchart shown in FIG. 5. If the special image processing flow is entered, it is first determined whether or not cross filter is carried out (S101). If an art filter has been set, the special effect to be executed as shown in the right column of FIG. 8 is determined. In this step it is determined whether or not an art filter that has been set on a menu screen requires cross filter processing. Specifically, in this embodiment, as shown in FIG. 8, in the case where fantastic focus+starlight, or pop art+starlight have been set, it is determined that cross filter processing will be carried out.

If the result of determination in step S101 is cross filter, then cross filter processing is carried out next (S103). Here, cross filter processing is applied to the image data by the special image processing section 109b. Cross filter processing is processing to detect high brightness parts from an image, and to portray and overlay a cross pattern on those parts.

Once the cross filter processing has been carried out, or if the result of determination in step S101 was that cross filter processing will not be carried out, it is next determined whether or not to carry out soft focus (S105). Here, it is determined whether or not an art filter that has been set on the menu screen requires soft focus processing. With this embodiment, as shown in FIG. 8, in the case where fantastic focus, fantastic focus+starlight, or fantastic focus+white edge have been set, it is determined that soft focus processing will be carried out.

If the result of determination in step S105 is soft focus, soft focus processing is next carried out (S107). Here, soft focus processing is applied to the image data by the special image processing section 109b. Soft focus processing involves carrying out feathering processing for the whole image, and combining with the image before feathering at a fixed ratio (for example, original image:feathered image=3:2).

Once soft focus processing has been carried out, or if the result of determination in step S105 was not soft focus, it is next determined whether to carry out noise addition (S109). Here, it is determined whether or not an art filter that has been set on the menu screen requires noise addition processing. With this embodiment, as shown in FIG. 8, it is determined to carry out noise edition processing when grainy film has been set.

If the result of determination in step S109 is noise addition, then next noise addition processing is carried out (S111). Here, noise addition processing is applied to the image data by the special image processing section 109b. Noise addition processing is processing to add a previously created noise pattern image to the subject image. It is also possible to create a noise pattern image based on a random number etc.

Once noise addition processing has been carried out, or if the result of determination in step S109 was not to carry out noise addition, it is next determined whether or not to carry out shading (S113). Here, it is determined whether or not an art filter that has been set on the menu screen requires shading processing. With this embodiment, as shown in FIG. 8, it is determined to carry out shading processing if pop art+pinhole has been set.

If the result of determination in step S113 was shading, shading processing is next carried out (S115). Here, shading processing is applied to the image data by the special image processing section 109b. Shading processing is processing to multiply a brightness signal by a coefficient that becomes smaller approaching the periphery, so that brightness becomes darker with increasing distance from the center.

Once shading processing has been carried out, or if the result of determination in step S113 was to not carry out shading, it is determined whether or not to carry out peripheral brightening (S117). Here, it is determined whether or not an art filter that has been set on the menu screen requires peripheral brightening processing. With this embodiment, as shown in FIG. 8, it is determined to carry out peripheral brightening processing when fantastic focus+white edge, or pop art+white edge have been set.

If the result of determination in step S117 is peripheral brightening, peripheral brightening processing is next carried out (S119). Here, peripheral brightening processing is applied to the image data by the special image processing section 109b. Peripheral brightening processing is processing to make peripheral brightness brighter, and is processing to change a pixel value so as to give higher brightness information towards the periphery (for example, 255, 255, 255 for RGB (8 bits) or 255, 0, 0 for YCbCr (8 bits)) in accordance with distance from the center, so that a peripheral section becomes white.

Once peripheral brightening processing has been carried out, or if the result of determination in step S117 was not to carry out peripheral brightening processing, it is next determined whether or not to apply a miniature effect (S121). Here, it is determined whether or not an art filter that has been set on the menu screen requires processing to apply a miniature effect to gradually blur moving away from a point of interest. With this embodiment, as shown in FIG. 8, it is determined to carry out applying the miniature effect when Diorama has been set.

If the result of determination in step S121 was applying miniature effect, miniature effect processing is carried out next (S123). Here, miniature effect processing is applied to the image data by the special image processing section 109b. Miniature effect processing is carrying out low pass filter processing while changing a low pass coefficient depending on position in the image, so that in accordance with distance from the center a degree of boke becomes larger towards the periphery. It is also possible, in this case, to gradually feather in only the lateral direction or only the vertical direction.

Once miniature effect processing has been carried out, or if the result of determination in step S121 was not miniature effect, special image processing is terminated and the original processing flow is returned to.

In this way, in the special image processing flow, various special image processing is applied as required depending on the art filter (special effect) that has been set. The special image processing here may sometimes be carried out on the basis of position of image data corresponding to a specified position of image data, such as soft focus etc. There may also be image processing that differs depending on the coordinate position of the image data, such as shading and peripheral brightening, or combining of image data that has been subjected to different processing for adjacent pixels such as cross filter or grainy film processing etc.

Next, the image processing and 3-D creation in step S55 (refer to FIG. 3) will be described using the flowchart shown in FIG. 6. As described previously, in the case where 3-D shooting mode and a special effect have been set on a menu screen, this processing flow is executed after the completion of shooting of two images using the mechanical shutter.

If the image processing and 3-D creation flow is entered, image processing is first carried out by the image processing section 109 (S131). Shooting was respectively carried out using the mechanical shutter in steps S29 and S53, and RAW image data is acquired for two images, and so in this step the image processing flow is executed for each RAW image data. This image processing flow is steps S71-S83 in the image processing flow shown in FIG. 4, and steps S85 and after are omitted here and not executed.

When executing the image processing flow of step S131, in the case where a special effect (art filter) has been set on the menu screen, image processing is carried out using image-processing parameters in accordance with the special effect (refer to the gamma conversion and color correction of step S79 (refer to FIG. 4)). As a result, contouring attributable to abrupt change in tone as well as brightness and color difference components, or to the number of bits of image data to be processed etc., do not occur and degradation in image quality does not arise.

Once image processing has been carried out, determination of 3-D clipping position and determination of correction processing are carried out (S133). Here, clipping position is specified and image correction processing is determined in order for the 3-D image creation section 115 to create a 3-D image from the two sets of image data that have been subjected to image processing. Specifically, feature amount (for example, edge component, color component, brightness component etc.) of an image is detected, and a clipping position is specified in order to create an image that can be viewed stereoscopically from the two images. Processing to correct for miniscule changes in shooting angle and correct for rotation etc. is also determined.

Next, a 3-D image is created (S135). Here, the image processing in step S131 causes the 3-D image creation section 115 to create a 3-D image using two sets of image data for which clipping position has determined and correction processing has been determined in step S133. In the case where a special effect (art filter) has been set on a menu screen, a 3-D image is created with images that have had color and contrast (gamma) processed in accordance with the set effect.

If creation of a 3-D image has been carried out, it is next determined whether or not to carry out special image processing (S137). If a special effect (art filter) has been set, image processing of step S131 is performed for chroma and gamma corresponding to the setting. However, for special image processing such as cross filter processing, soft focus processing, noise addition processing, shading processing, peripheral brightening processing, and miniature effect processing which is an effect like that optically formed using an optical filter and lens at the time of shooting, noise addition processing which is like reproduction of the granularity of film, soft focus processing, and shading processing etc. which are like carrying out development and printing, the image processing of step S131 is not carried out. In this step therefore, it is determined whether or not these various types of special image processing are required. In the case where special effect (art filter) has been set also, in the case of pop art, (not shown) natural, and vivid (not shown), only chroma and gamma are changed, and so no further special image processing is acquired.

If the result of determination in step S137 is that special image processing is required, special image processing is executed (S139). Here, the special image processing section 109b carries out image processing in accordance with the special image processing flow shown in FIG. 5. Within the special image processing, for shading, peripheral brightening, and miniature effect, there is variation in accordance with distance from a central point for the image processing. The central point for the image processing in the case of a 3-D image will described later using FIG. 10.

Once special image processing carried out, or if the result of determination in step S137 is that special image processing is not required, the flow for image processing and 3-D creation is terminated, and the original processing flow is returned to.

FIG. 10 shows a left eye image 401 taken at a first position and a right eye image 403 taken at a second position, in the case where 3-D shooting mode has been set, with a person 411 and a mountain 413 as a subject. Since the mountain 413 is further away, it is portrayed as almost the same position in the left eye image 401 and the right eye image 403, but as the person 411 is positioned closer, the position at which they are portrayed differs between the two images. Specifically, with the example shown in FIG. 10, the position of the person 411 differs, with the person 411 in the left eye image 401 being positioned a distance a from the center towards the right, and the person 411 in the right eye image 403 being positioned a distance b from the center towards the left. As the center point for 3-D image processing, the position of a main subject, that does not cause a feeling of discomfort when a 3-D image is created, is selected. For example, it is possible to select a subject that is closest, a face position that has been detected by a face detection section, or the position of a pet etc.

Since an image-processing center is respectively determined for the left and right images, first of all one of them is determined as a reference image. If the left eye image 401 is determined as the reference image, then a position on the right eye image 403 corresponding to an image processing center point 421a of the left eye image 401 is made an image processing center point 421b. Accordingly, the image processing center points 421a and 421b respectively correspond to the same position of the same subject. However, this position should be within a range such that it does not appear strange after image processing as a 3-D image, even if there are some minor deviations.

In this way, with this embodiment, a specified position of an image that is made a reference is determined as an image center point, and in the other image a position corresponding to this position is also determined to be an image center point. With these image processing center points 421a and 421b as a center, special effects that vary in accordance with distance from the center position, such as shading processing, are applied. As a result, an image that does not look strange with respect to the right eye image and the left eye image is obtained.

Next, the relationship between image data flow and processing when 3-D shooting mode has been set, in this embodiment, will be described using FIG. 7. When 3-D shooting mode is set, RAW data for the left eye is acquired at the first position (#201L, S29 in FIG. 2). This left eye RAW data is subjected to basic image processing such as gamma and chroma (203L, S131 in FIG. 6), to acquire a left eye image corresponding to a finished effect (#205L). On the other hand, right eye RAW data is acquired at the second position (#201R, S53 in FIG. 3), basic image processing such as gamma and chroma is applied (203R, S131 in FIG. 6), and a right eye image corresponding to a finished effect is acquired (#205R).

Once images corresponding to the finished effect have been acquired for the left eye and the right eye, a 3-D clipping position and correction processing are determined (#211, S133 in FIG. 6), a 3-D image is created (#221, S135 in FIG.

6), respective special image processing is applied to the left eye and right eye images (#223, S139 in FIG. 6), and a 3-D art image is created (#225).

In this way, with the first embodiment, gamma processing (tone processing) and chroma (color correction processing) are applied to the RAW data (#203L, #203R), and a 3-D image is created by carrying out correction processing with a clipping position for creating a 3-D image, or by geometric transformation such as image rotation or trapezoidal correction, using this image processed image data (#211, #221). Image processing for this 3-D image is carried out, and further special effect processing analogous to an image formed using photographic film and development and printing processing is applied on image data that has been subjected to image processing for a 3-D image analogous to an image that has been formed optically (#223). As a result, it is possible to create a 3-D art image that can be played back at high-quality together with a 3-D image and an art (special effect).

With this embodiment, with respect to basic processing (#203L, #203R, S131), both gamma processing (tone processing) and chroma processing (color correction processing) are carried out, but it is also possible to only carry out tone processing here. Also, after creating left eye and right eye images corresponding to the finished effect, 3-D clipping position and correction processing are determined (#211, S133), but it is also possible to determine only one or the other.

Next, a second embodiment of the present invention will be described using FIG. 11 and FIG. 12. In the first embodiment, regarding the image processing of step S131 when carrying out image processing and 3-D creation from 2 sets of RAW data that were taken at first and second positions, gamma processing and chroma processing corresponding to a set special effect (art filter) were carried out, and 3-D image creation was carried out using these processed image data. Differing from this, in the second embodiment, when carrying out image processing and 3-D creation from the two sets of RAW data taken at first and second positions, gamma processing and chroma processing is carried out corresponding to a Natural finished image, and clipping position and correction processing for a 3-D image are determined using this image. Separately, 3-D image clipping and correction processing is applied to an image that has been obtained by subjecting RAW data to gamma processing and chroma processing corresponding to a finished image, in order to create a 3-D image, and then a special effect is applied.

Figure 6:
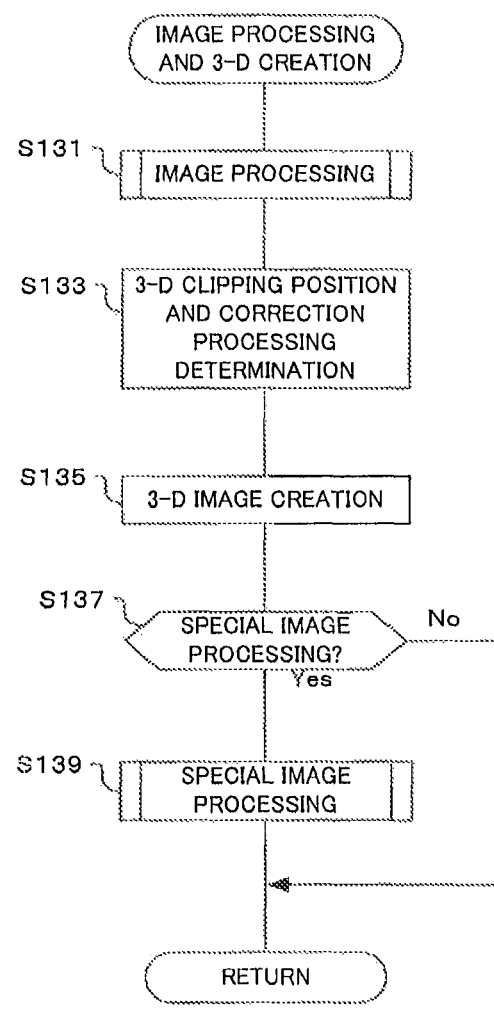
FIG. 6 is a flowchart showing operation of image processing and 3D creation for the camera of the first embodiment of the present invention.
Figure 11:
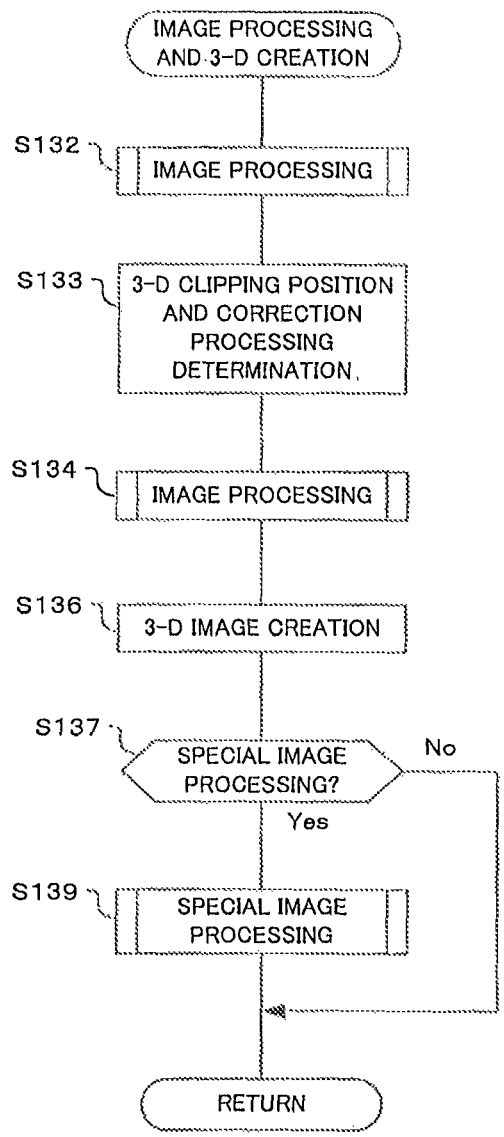
FIG. 11 is a flowchart showing operation of image processing and 3D creation for a camera of a second embodiment of the present invention.
Figure 12:
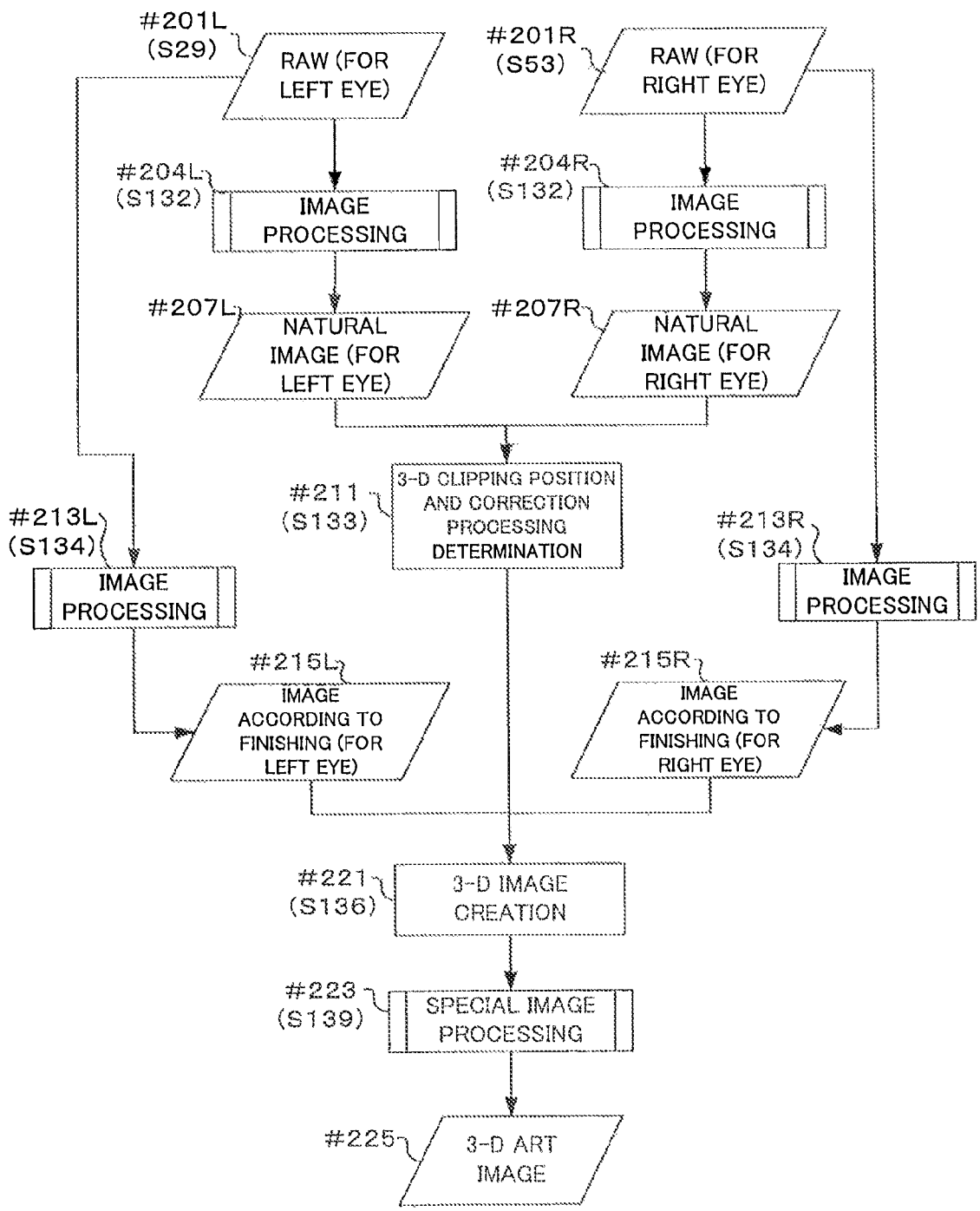
FIG. 12 is a drawing showing the relationship between data and processing in the camera of the second embodiment of the present invention.
Figure 13:
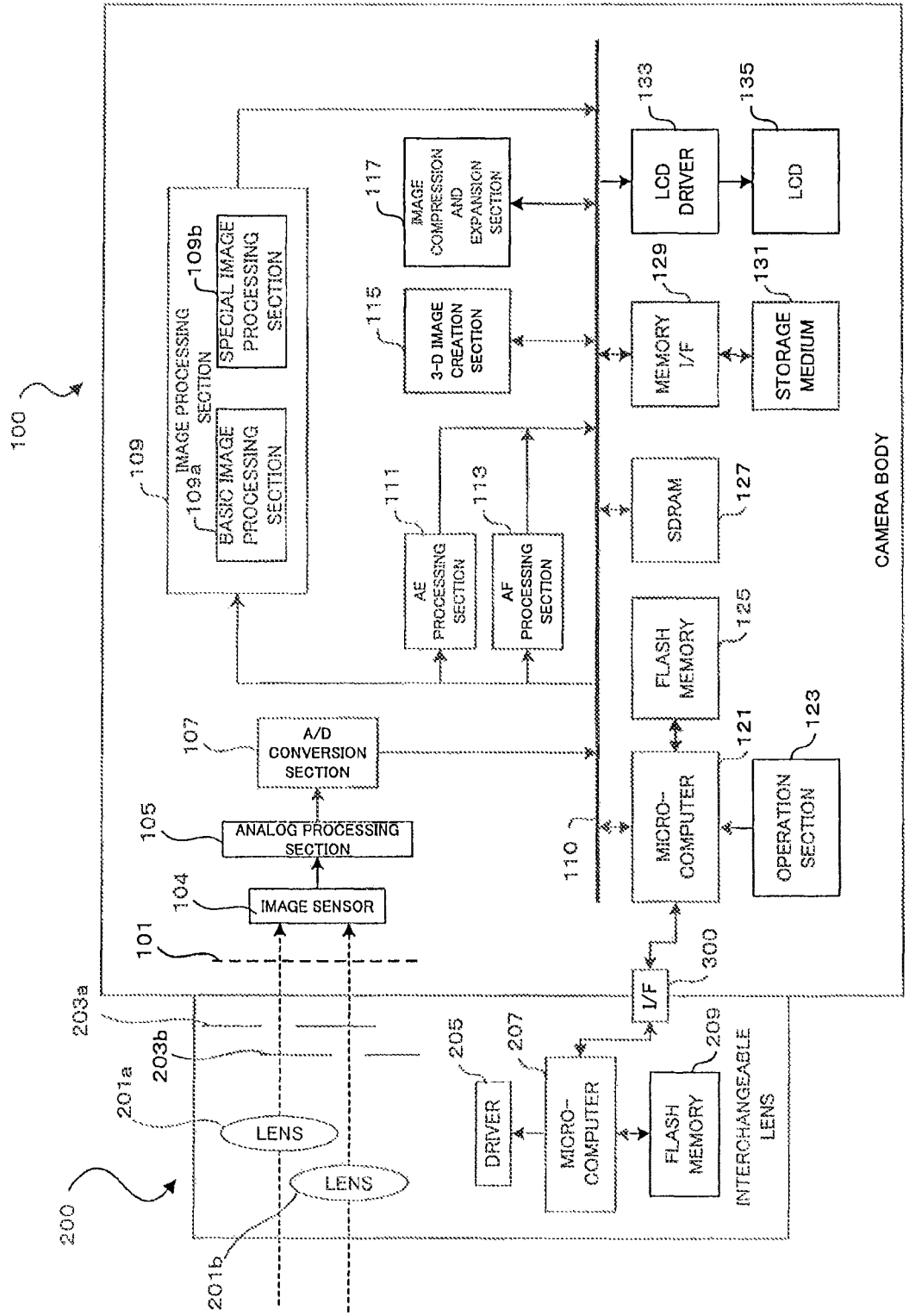
FIG. 13 is a block diagram mainly showing the overall structure of electrical systems of a camera of a third embodiment of the present invention.

The structure of the second embodiment is similar to that of the first embodiment shown in FIG. 1, and the operation is similar to the flow shown in FIG. 2 to FIG. 5, with the only difference being that the image processing and 3-D creation flow shown in FIG. 6 is changed to the flow shown in FIG. 11. Description will therefore be given for the image processing and 3-D creation flow shown in FIG. 11. For steps that execute the same processing as in FIG. 6, the same step numbers will be assigned and detailed description will be omitted. The flowchart shown in FIG. 11 is also executed by the microcomputer 121 in accordance with programs stored in the flash memory 125.

If the image processing and 3-D creation flow of FIG. 11 is entered, image processing is first carried out (S132). Here, the basic image processing section 109a executes steps S71 to S83, among the respective image processing shown in FIG. 4, on the two sets of RAW data that have been acquired in step S29 and S53. During this flow, regarding the gamma conversion and color correction of step S79, image processing is carried out with a finished effect for the image set to Natural. Processing other than Natural can also be used as long as it is a special effect that is close to a standard finish.

Once the image processing of step S132 has been executed, 3-D clipping position and correction processing are next determined (S133). Here, similarly to the first embodiment, the 3-D image creation section 115 detects feature amount of the image (edge component, color component, brightness component) using the two images that were image processed in step S132, and a clipping position for creating an image that can be viewed stereoscopically from the two images, and processing to correct microscopic changes in shooting angle and rotation etc., are determined Next, image processing is executed (S134). Here, steps S71 to S83, among the respective image processing shown in FIG. 4, are executed not for the image that was processed in step S132, but on the two sets of RAW data that have been acquired in step S29 and S53. Within this flow, for the gamma conversion and color correction of step S79, image processing is carried out with parameters such as gamma and chroma set according to a finished effect that was set on the menu screen.

Once the image processing of step S134 has been carried out, 3-D image creation is carried out (S136). Here, a 3-D image is created using the left image and the right image that have been image processed in step S134, based on the 3-D clipping position and correction processing that were determined in step S133.

Once a 3-D image has been created, next, similarly to the first embodiment, it is determined whether or not special image processing is required (S137), and if the result of this determination is that special image processing is required, special image processing is carried out (S139) and the original processing flow is returned to.

The relationship between flow of image data and image processing in this embodiment will be described using FIG. 12. When 3-D shooting mode is set, RAW data for the left eye is acquired at the first position (#201L, S29 in FIG. 2). This left eye RAW data is subjected to image processing with parameters such as gamma and chroma set so as to give Natural as a finished effect (#204L, S132 in FIG. 11), and a Natural image for the left eye corresponding to the Natural setting finished effect is obtained (#207L). On the other hand, RAW data for the right eye is acquired at the second position (#201R, S53 in FIG. 3), image processing is carried out with parameters such as gamma and chroma set so as to give Natural as a finished effect (#204R, S132 in FIG. 11), and a Natural image for the right eye corresponding to the Natural setting finished effect is obtained (#207R).

Once the Natural images for the left eye and the right eye have been obtained, determination of 3-D cropping position and correction processing content is carried out using the Natural images (#2211, S133 in FIG. 11). On the other hand, using RAW data for the left eye, image processing is carried out so as to give finishing corresponding to a special effect (art filter) that has been set for the finished effect (#213L, S134 of FIG. 11), and a left eye image corresponding to the finished effect is obtained (#215L). Also, using RAW data for the right eye, image processing is carried out so as to give finishing corresponding to a special effect (art filter) that has been set for the finished effect (#213R, S134 of FIG. 11), and a right eye image corresponding to the finished effect is obtained (#215R).

3-D image creation (#221, S136 in FIG. 11) is carried out for the left and right images corresponding to the finished effect (#215L, #215R) using the determined 3-D clipping position and correction processing (#211). Here, respective special image processing is carried out for the created left eye and right eye images (#223, S139), to create a 3-D art image (#225).

In this way, in the second embodiment, gamma correction (tone processing) and chroma correction (color correction processing) for the RAW data is processed using parameters for a finished effect setting of Natural (#204L, #204R), and determination of cropping position for creating a 3-D image and content of correction processing such as geometrical transformation is carried out using this image processed image data. Also, separately from the image processing in #204L and #204R, using RAW data for the left eye and for the right eye, image processing is carried out using parameters for gamma correction (tone processing) and chroma correction (color correction processing) corresponding to a special effect (art filter) that has been set as a finished effect (#213L, #213R), to obtain images in accordance with the finished effect (#215L, #215R). When creating a 3-D image, a 3-D image is created from images that have been acquired in #215L and #215R in accordance with 3-D clipping position and correction processing that were determined in #211. With this embodiment, clipping position and correction processing for 3-D image creation are determined based on images that have been processed with finished effect set to Natural, which makes it possible to correctly determine clipping position and correction processing without being influenced by gamma correction and chroma correction for the case of the special effect (art filter), and it is possible to create a 3-D art image that can be played back at high-quality together with a 3-D image and the art (special effects) image.

Also, with the second embodiment, the flash memory 125 functions as an image processing parameter storage section for storing a gamma table (first image processing parameter) for determining image processing content for the basic image processing section 109a functioning as a tone conversion section, and a second image processing parameter for special effect, that is different from the first image processing parameter, for determining image processing content for the basic image processing section 109a functioning as a tone conversion section in accordance with special effect. Here the first image processing parameter is image processing for a natural impression such as Natural, for example, and the second image processing parameter is an image processing parameter corresponding to a special effect (art filter) that has been set on the menu screen. With a special effect (art filter), compared to the parameter for Natural, an image processing parameter such that contrast is enhanced or softened, and an image processing parameter such that gamma with dark sections (black) floating and saturated sections (white) do not become maximum values etc. are used. With the second embodiment, processing content carried out by the 3-D image creation section 115 (stereoscopic image data processing section) using images that have been subjected to image processing by the tone processing section is determined using the first image processing parameter, the tone conversion section carries out image processing for a special effect using the second image processing parameter, and a stereoscopic image is created for images that have been subjected to image processing for a special effect by the 3-D image creation section 115 (stereoscopic image data processing section).

With this embodiment also, with respect to basic processing (#213L, #213R, S134 in FIG. 11), both gamma processing (tone processing) and chroma processing (color correction processing) are carried out, but it is also possible to only carry out tone processing here. Also, after creating left eye and right eye images corresponding to the finished effect, 3-D clipping position and correction processing are determined (#211, S133), but it is also possible to determine only one or the other.

Next, a third embodiment of the present invention will be described using FIG. 13 to FIG. 16. With the first and second embodiments, there was only one photographing lens 201, and in order to acquire parallax images, after shooting at a first position the camera was moved to a second position and shooting performed again. Differing from that, with the third embodiment, two photographing lenses are provided, and two parallax images are acquired at the same time.

The structure of the third embodiment differs from the block diagrams shown in FIG. 1 only in that the photographing lens 201 is replaced with two photographing lenses 201a and 201b, that the diaphragm 203 is replaced with two diaphragms 203a, 203b, and that the image sensor 103 is replaced with the image sensor 104. Only these points of difference will be described, with the same reference numerals been assigned to the same members, and detailed description thereof being omitted.

The right eye photographing lens 201a and the left eye photographing lens 201b are arranged on the same plane (depicted as staggered positions in the drawing of FIG. 13), and arranged so that is possible to respectively shoot subject light flux for the right eye and the left eye at the same time. The right eye diaphragm 203a is arranged on the optical axis of the right eye photographing lens 201a while the left eye diaphragm 203b is arranged on the optical axis of the left eye photographing lens 201b, to respectively control the amount of subject light flux that is passed.

The image sensor 104 is arranged on the optical axes of the right eye photographing lens 201a and the left eye photographing lens 201b. A left eye image and a right eye image are formed on this image sensor 104, that is, on a single image sensor.

Also, a movie button for starting or stopping movie shooting is arranged within the operation section 123. In an initial state, there is a movie not yet shot state, and if the movie button is pressed in this state shooting of the movie is commenced, and if the movie button is pressed during movie shooting, shooting of the movie is stopped. Accordingly, every time the movie button is pressed shooting of the movie repeatedly alternates between start and stop.

With the third embodiment, the photographing lenses 201a and 201b are provided separately, but it is also possible to provide only a single lens, and to separate subject light flux for the left eye and for the right eye by utilizing an image sensor and a light shielding member. It is also possible for the photographic lens to be of a fixed type instead of interchangeable type. Also, images for the left and for the right are received on the single image sensor 104, but it is also possible to arrange two image sensors, and to acquire separate image signals.

Next, operation of the third embodiment will be described using the flowcharts shown in FIG. 14 to FIG. 16. These flowcharts are executed by the microcomputer 121 in accordance with programs stored in the flash memory 125, similarly to the first and second embodiments.

Figure 14:
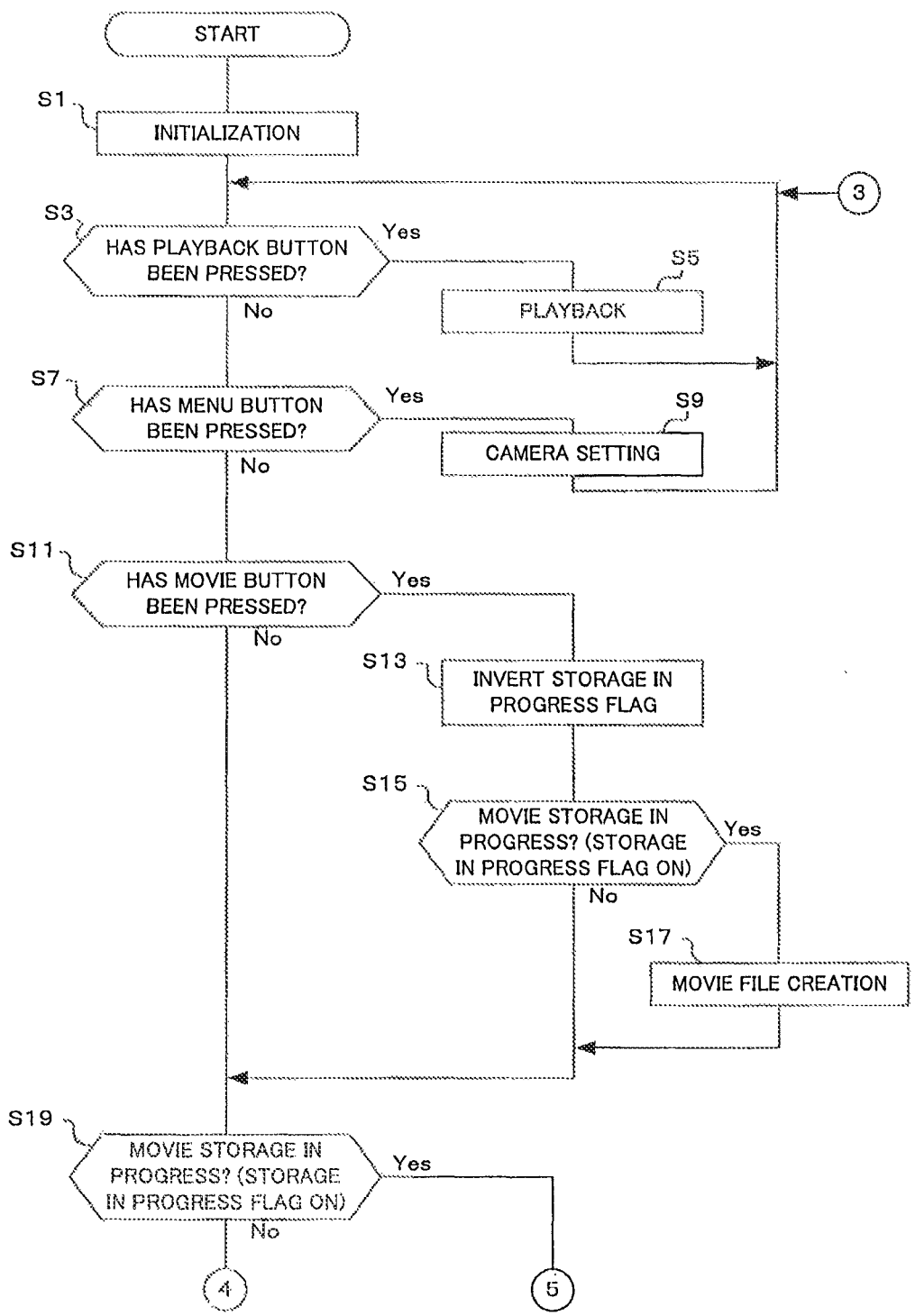
FIG. 14 is a flowchart showing main flow of the camera of the third embodiment of the present invention.
Figure 15:
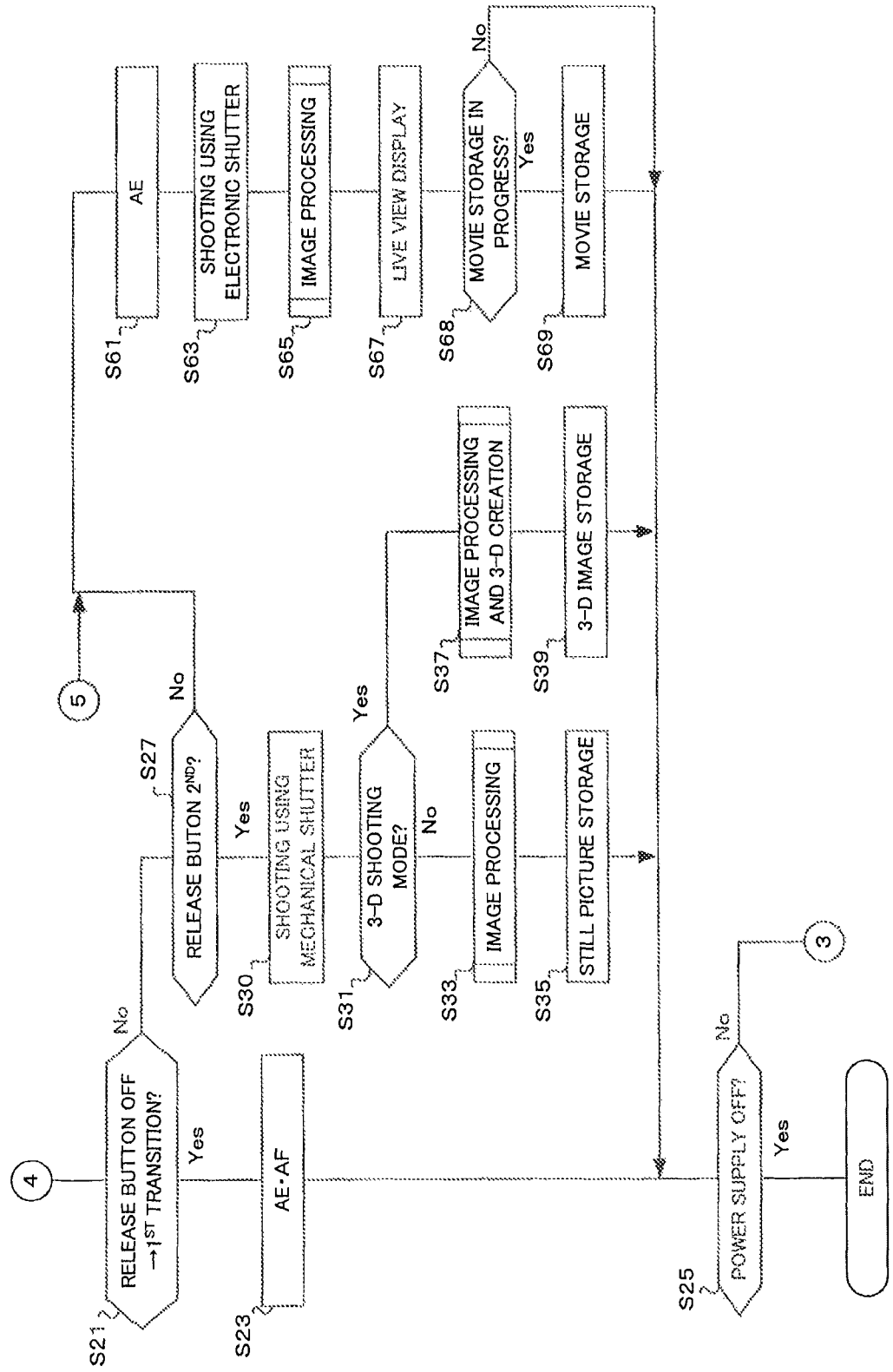
FIG. 15 is a flowchart showing main flow of the camera of the third embodiment of the present invention.
Figure 16:
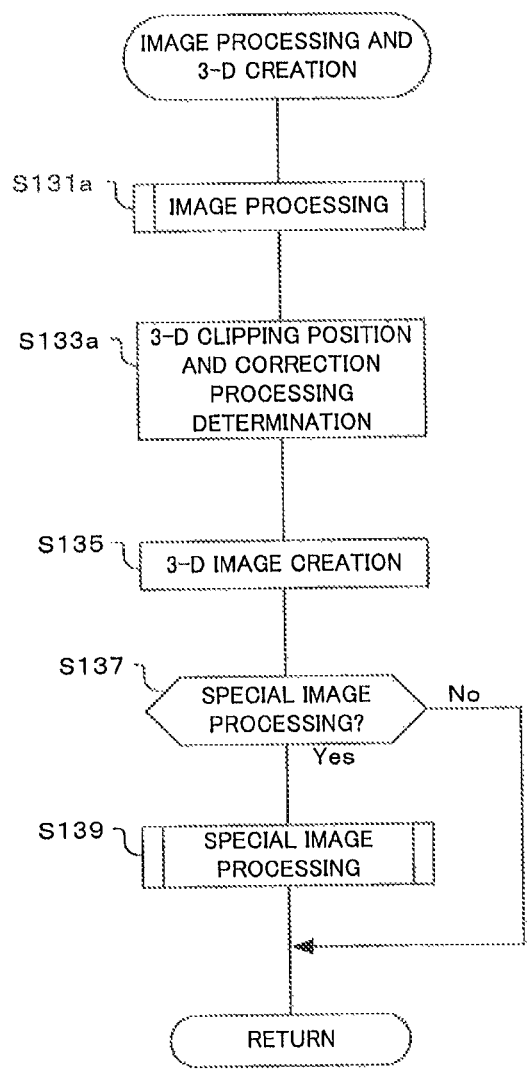
FIG. 16 is a flowchart showing operation of image processing and 3D creation for the camera of the third embodiment of the present invention.

FIG. 14 and FIG. 15 are the main flow of this embodiment. In this main flow, for steps that execute the same processing as in the flow shown in FIG. 2 and FIG. 3 of the first embodiment, the same step numbers will be assigned and detailed description will be omitted. Compared to the first embodiment, with this embodiment, if the release button is pressed down fully and the second release switch is turned on, two images are obtained at the same time (S27, S30), and in the event that 3-D shooting mode has been set image processing and 3-D creation are carried out immediately after imaging (S31, S37). Also, if the movie button is operated movie storage is performed (S11-S17), and in the event that 3-D shooting mode has been set, 3-D image creation and a special effect are carried out during movie shooting, and movie storage is performed (S65-S69).

If the main flow is started, initialization (S1) is carried out. Here, mechanical initialization and electrical initialization, such as initialization of flags etc., are carried out. As the initialization of various flags etc. initialization of a storage in progress flag is carried out. This storage in progress flag is a flag representing whether or not a movie is being stored, and if the flag is on it means that storage of a movie is in progress, while when the flag is off it means that storage of a movie is not being carried out.

Once initialization has been carried out, it is next determined whether or not the playback button has been pressed (S3), and if it has been pressed playback is carried out (S5), and step S3 is returned to. At the time of playback processing, in the case where an image that has been selected from a list is a movie, it is subjected to sequential movie playback from a leading frame, in time series. Also, if the selected image is a still image a fixed still image is displayed.

If the result of determination in step S3 was that the playback button was not pressed, it is next determined whether or not the menu button has been operated (S7). If the result of this determination is that the menu button has been pressed, camera setting is carried out (S9), and step S3 is returned to. With the camera setting, similarly to the first embodiment, various settings are possible, and it is also possible to carryout settings for 3-D shooting mode and special effect (art filter) here.

If the result of determination in step S7 is that the menu button has not been pressed, it is next determined whether or not the movie button has been pressed (S11). In this step the operating state of the movie button of the operation section 123 is detected, and determination is carried out based on the detection result.

If the result of determination in step S11 is that the movie button has been pressed, inversion of the storage in progress flag is next carried out (S13). As was described previously, since start and stop of movie shooting is repeatedly alternated every time the movie button is pressed, in this step the storage in progress flag is inverted to ON if the storage in progress flag is off, and inverted to OFF if the storage in progress flag is on.

Once inversion of the storage in progress flag has been carried out in step S13, it is next determined whether or not storage of a movie is in progress (S15). Since the storage in progress flag indicates a storage state of a movie, in this step it is determined whether or not the storage in progress flag is on. If the result of this determination is that movie storage is in progress, creation of a movie file is carried out (S17). Here, a movie file such as MPEG is created. Movie file storage is carried out in step S69, which will be described later.

If creation of a movie file has been carried out in step S17, or if the result of determination in step S15 was that movie storage was not in progress, or if the result of determination in step S11 was that the movie button had not been pressed, next, similarly to step S15, it is determined whether or not movie storage is in progress (S19).

If the result of determination in step S19 is that movie storage is not in progress, next, similarly to the first embodiment, it is determined whether or not the release button has been pressed down halfway and the first release switch has transitioned from off to on (S21). If the result of this determination is that the first release switch of the release button has transitioned from off to on, an AE operation and an AF operation are executed (S23). Here, exposure control values such as aperture and shutter speed are calculated, and the photographing lenses 201a and 201b are focused. Accordingly, in the case where movie storage is not in progress, namely when in still picture shooting mode, if the release button is pressed down half way calculation of the exposure control values and focusing of the photographing lenses 201a, 201b are carried out at that point in time.

If the result of determination in step S21 is that the first release switch of the release button has not transitioned from off to on, it is next determined, similarly to the first embodiment, whether or not the release button has been pressed down fully, and the second release switch has been turned on (S27). If the result of this determination is that the second release has been performed, shooting is performed using the mechanical shutter (S30). With the first embodiment, even when 3-D shooting mode was set it was only possible to acquire one of either the left eye image or the right eye image, but with this embodiment it is possible to acquire a single RAW image that depicts both the right eye image and the left eye image, from the image sensor 104. If 3-D shooting mode has not been set, an image for either the right eye or the left eye (for instance, the right eye image) is acquired If shooting using the mechanical shutter has been carried out, next, similarly to the first embodiment, it is determined whether or not the camera is in 3-D shooting mode (S31), and if the result of this determination is that it is not 3-D shooting mode image processing is carried out for the single image that was acquired in step S30 (S33), and still picture storage is carried out (S35).

If the result of determination in step S31 is that the camera is in 3-D shooting mode, then image processing and 3D creation are carried out (S37). As was described previously, since two parallax images are acquired in step S30, in this step the two images are image processed and a 3-D image is created. Detailed operation of this image processing and 3-D creation will be described later using FIG. 16. Once a 3-D image has been created storage of the 3-D image in the storage medium 131 is carried out (S39).

If the result of determination in step S27 is that the second release switch was not turned on, or if the result of determination in step S19 was that movie storage is in progress, next, similarly to the first embodiment, and AE operation is carried out (S61). This step S61 and afterward are executed only when any operation of the release button is made in still picture shooting mode and live view display is simply being carried out, or in a case where movie storage is in progress.

If an AE operation has been carried out in step S61, next, similarly to the first embodiment, shooting using the electronic shutter is carried out (S63), and image processing is carried out (S65). Here, image processing is carried out together with carrying out an AE operation in order to obtain appropriate exposure for live view display or movie shooting. With this image processing, since the flow shown in FIG. 4 is executed, together with carrying out basic image processing, if 3-D shooting mode has not been set image processing for a special effect (art filter) is also executed.

If image processing has been carried out, live view display is next carried out (S67), similarly to the first embodiment. Live view display on the LCD 135 is carried out using image data that was subjected to image processing in step S65. By looking at the live view display, the photographer can determine composition, can determine when to take the shot if still picture shooting is in progress, or can determine when to finish shooting if movie shooting is in progress.

Once live view display has been carried out next, similarly to steps S15 and S19, it is determined whether or not movie storage is in progress (S68). Determination as to whether or not movie storage is in progress is carried out based on the storage in progress flag. If the result of this determination is that movie storage is in progress, movie file storage is carried out (S69). Here, data that has been subjected to image processing in step S65 is compressed by the image compression and expansion section 117 using a format such as H.264 or Motion-JPEG, and stored in the storage medium 131.

If image processing has been carried out in step S69, if the result of determination in step S68 was that movie storage was not in progress, if 3-D image storage has been carried out in step S39, if still picture storage was carried out in step S35, or if AE/AF was carried out in step S23, it is next determined whether or not the power supply is off (S25). In this step it is determined whether or not the power supply button of the operation section 123 has been pressed again. If the result of this determination is that the power supply is not off, processing returns to step S3. On the other hand if the result of determination is that the power supply is off, a termination operation of the main flow is executed and then the main flow is terminated.

Next, the detailed operation of the image processing and 3-D creation in step S37 will be described using FIG. 16. If the image processing and 3-D creation flow is entered, image processing is first carried out (S131a). Since single RAW image data depicting a right eye part and a left eye part was acquired by shooting using the mechanical shutter in step S30, in this step the image processing flow is executed for each part of the RAW image data. In this flow, similarly to the first embodiment, in the case where special effect (art filter) has been set, gamma correction (tone correction) and chroma correction (color correction) corresponding to the set special effect are carried out. This image processing flow is steps S71-S83 in the image processing flow shown in FIG. 4, and steps S85 and after are omitted here and not executed. In the case where different image sensors are arranged for the left eye and the right eye, image processing is respectively carried out for two sets of RAW data.

Once the image processing of step S131a has been executed, 3-D clipping position and correction processing are next determined (S133a). In the first embodiment, the right eye image and the left eye image were shot separately, and so processing was determined to correct minute variations in viewing angle, and correct rotation etc. With the third embodiment, since two images are formed on the same image sensor, correction as in the first embodiment is not required, but since errors may arise at the manufacturing stage etc. these errors are corrected. Specifically, viewing angle correction information for absorbing the above-described errors is held in the flash memory 209 within the interchangeable lens 200, and is acquired by communication with the lens, to determine correction of clipping position and a method of correcting viewing angle. In the case of a plurality of image sensors, it is also possible to take into consideration positional variation of the image sensors.

Next, 3-D image creation is carried out (S135). Here, the 3-D image creation section 115 performs the image processing in step S131a, and in step S133a a 3-D image is created utilizing the determination of 3-D clipping position and correction processing.

If 3-D image creation has been carried out, it is next determined whether or not to carry out special image processing (S137). Here, in the event that a special effect (art filter) has been set, then similarly to the first embodiment it is determined whether or not additional special image processing is required. If the result of this determination is that special image processing is required, then the special image processing is executed (S139), similarly to the first embodiment. Once special image processing has been carried out, or if the result of determination in step S137 is that special image processing is not required, the flow for image processing and 3-D creation is terminated, and the original processing flow is returned to.

In this way, with the third embodiment of the present invention, images for the left eye on the right eye are acquired at the same time, image processing such as gamma correction (tone correction) and chroma correction (color correction) is carried out for these acquired images, and after that 3-D clipping position and correction processing are determined. A 3-D image is created in accordance with the clipping position and correction processing that have been determined here, and after 3-D image correction necessary special image processing is carried out. As a result, when carrying out clipping and rotational and trapezoidal correction etc. for an image that has been subjected to a process to create a three-dimensional image, it is possible to create a three-dimensional image that does not appear strange without significantly changing the image.

Figure 17:
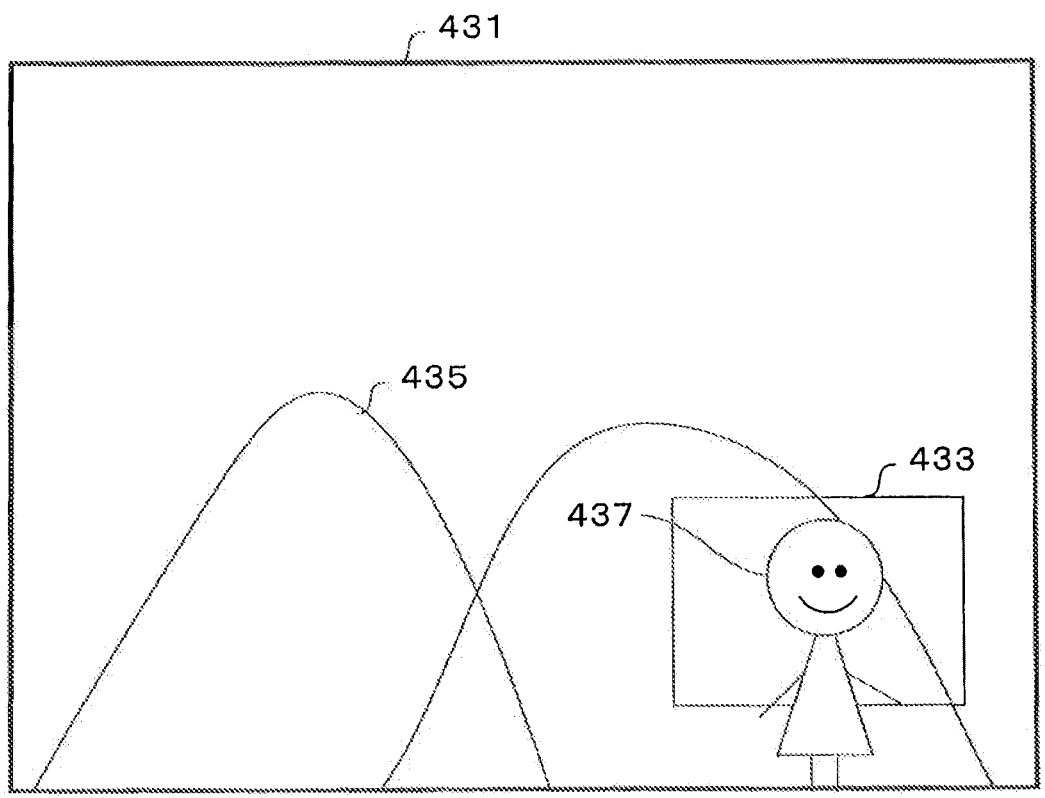
FIG. 17 is a drawing for describing multi-recording to which the camera of the first to third embodiments of the present invention can be applied.

Multi-recording to which the camera of the first to third embodiments of the present invention can be applied will be described using FIG. 17. FIG. 17 shows an overall image 431 taken of a background and a person, with the overall image 431 containing a mountain 435 and a person 437. Together with the overall image 431, the camera stores a partial image 433 of a primary subject, including the person 437, in the storage medium 131 separately to the overall image 431. A system of separately storing a plurality of images that have been acquired with one shot in this way is called multi-recording. Multi-recording includes not only the situation where images for different viewing angles are stored, as in the above-described example, but also storing a plurality of images that have been subjected to image processing with different finished effects, even if there is only the overall image 431.

In the case where multi-recording is carried out, it is possible to store a plurality of images such as the overall image 431 and a partial image 433 (with the example of FIG. 17, two images are stored). At the time of multi-recording, 3-D shooting mode can also be set, and in this case (the example of FIG. 17), a right eye overall image, left eye overall image, right eye partial image, and left eye partial image are stored in the storage medium 131 in order to create a 3-D image. In the case where special effect (art filter) has been set together with 3-D shooting mode, it is possible to create a 3-D image that has been subjected to a special effect using a procedure such as that described for the first to third embodiments of the present invention.

For example, if 3-D image creation with the special effect of the second embodiment applied is utilized, a normal two-dimensional image, a 3-D image, and a 3-D image to which a special effect has been applied are created. Specifically, in FIG. 12, it is possible to acquire normal two-dimensional images from #204L and #204R. By replacing #215L and #215R with #207L and #207R and creating a 3-D image, it is possible to create a 3-D image to which a special effect has not been applied.

In the case where the special image processing is carried out in #223, the special image processing is carried out with substantially the same location of a subject in the left eye image and the right eye image made an image processing center, as was described using FIG. 10. In the case of carrying out multi-recording, it is possible to carryout image processing with the overall image 431 and the partial image for 33 by determining an image processing center appropriate to each image.

When creating a 3-D image to which a special effect has been applied, with respect to an image used when determining 3-D clipping position and correction processing, it is possible to prevent change from being caused using rotation or trapezoidal correction, or to prevent "tone jump" due to insufficient bit precision when converting contrast and chroma that significantly impact on the stereoscopic effect, by carrying out tone conversion etc. using the basic image processing section 109*a*, and it is possible to create a three-dimensional image that does not appear strange.

In this way, for a camera that is capable of multi-recording, in the case of creating image data other than a 3-D image to which a special effect has been applied together with the 3-D image, the basic image processing section 109*a* for carrying out tone conversion (gamma correction), besides tone conversion, carries out processing to tone convert RAW data in accordance with a created image other than a stereoscopic special image effect. As a result, at the time of multi-recording and live view switching, it is possible to create a normal two-dimensional image, only a three-dimensional image, and a 3-D image to which a special effect has been applied, together. It is also possible, instead of creating all of these three types of image, to only create two of them.

Next, a dual engine to which the camera of the first to third embodiments of the present invention can be applied will be described using FIG. 18. In the block diagrams shown in FIG. 1 and FIG. 13, only one image processing section 109 is provided, and the right eye image data and the left eye image data are processed sequentially in time series. If two of each of the basic image processing section 109*a* and the special image processing section 109*b* of the image processing section 109 are provided, namely if a dual engine are provided, it is possible to simultaneously process the right eye image data and the left eye image data.

Figure 7:
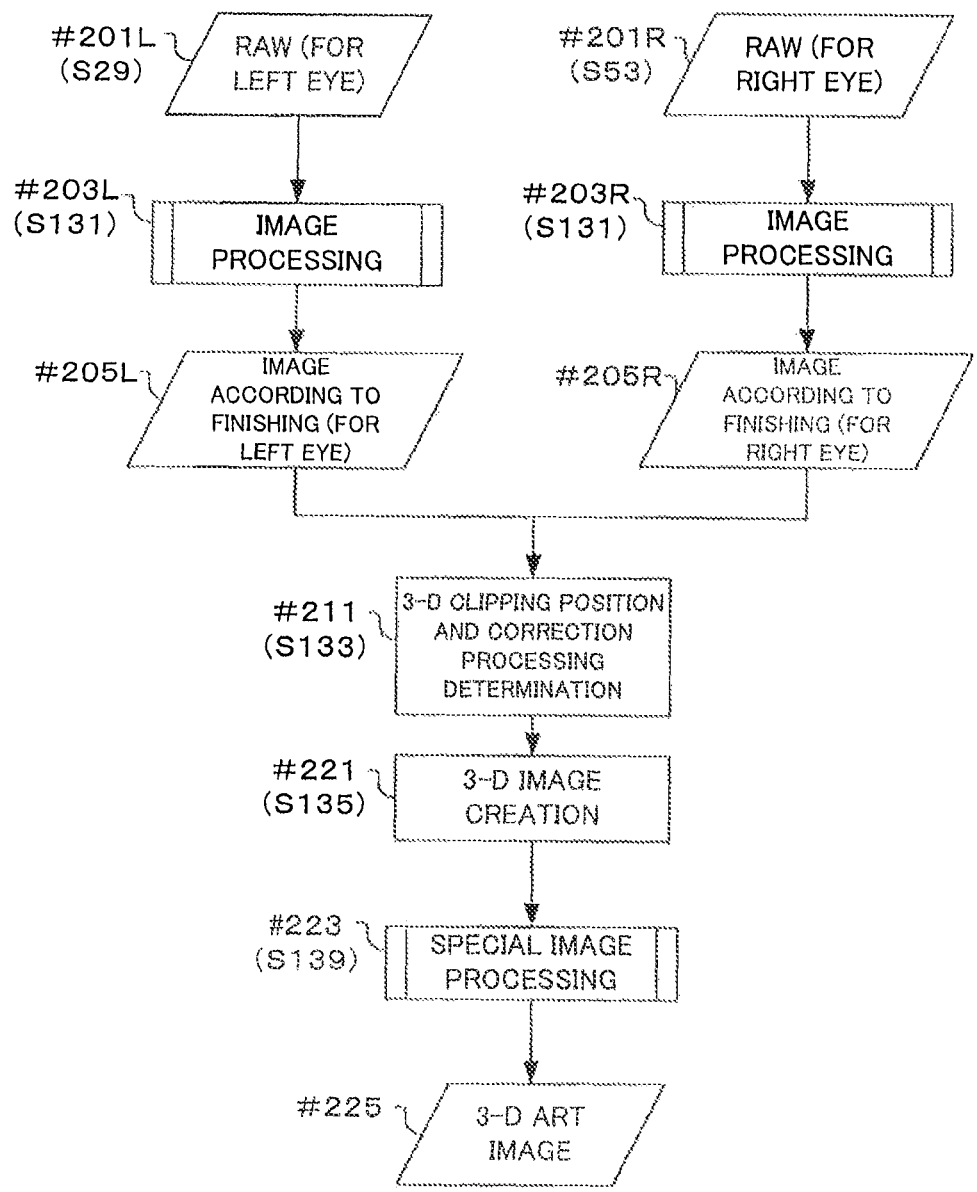
FIG. 7 is a drawing showing the relationship between data and processing in the camera of the first embodiment of the present invention.
Figure 18:
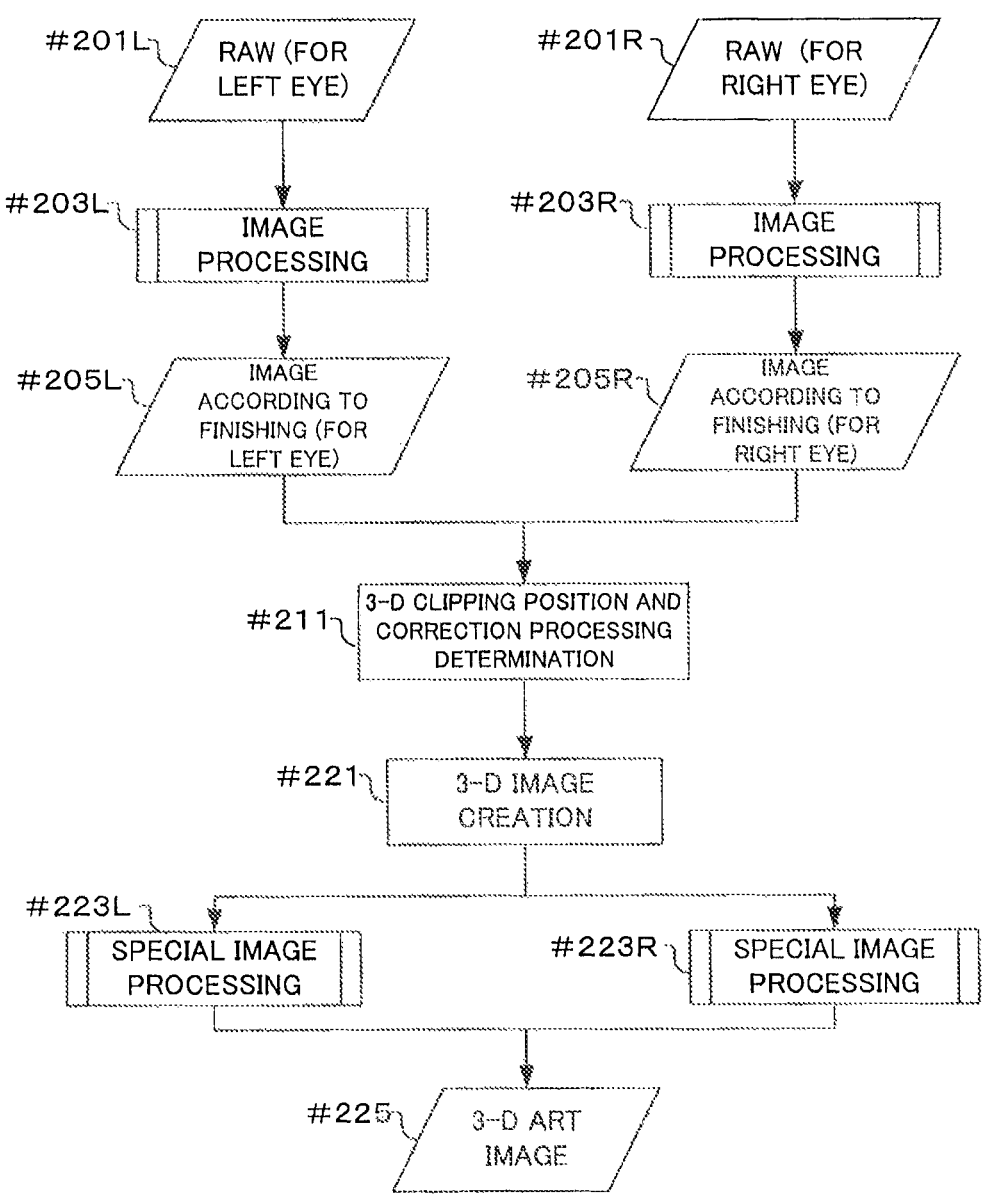
FIG. 18 is a drawing for describing a dual engine to which the camera of the first to third embodiments of the present invention can be applied.

FIG. 18 shows the flow of image data and processing in the case where the image processing section 109 is made dual engine, corresponding to FIG. 7 for the first embodiment. In FIG. 18, for the left eye image #201L, #203L, #205L, and #223L are processed by one processing section of the image processing section 109, and for the right eye image #201R, #203R, #205R, and #223R are processed by another processing section of the image processing section 109. Also, #211 and #221 are processed by the 3-D image creation section 115.

In this way, it is possible to perform image processing for the right eye image data and the left eye image data in parallel by making the image processing section 109 dual engine. As a result it is possible to shorten the time required for image processing. In particular, in combination with the above-described third embodiment, since it is possible to simultaneously shoot left and right images, it is possible to easily realize a 3-D art movie to which a special effect has been applied.

As has been described above, with each of the embodiments of the present invention and their applications, using image data acquired by subjecting RAW data to tone conversion corresponding to a special effect (including processing to give natural appearance such as Natural), stereoscopic image data is created after carrying out processing for at least one of clipping as image data to be viewed stereoscopically or geometric transformation, and a special effect is applied to this created three-dimensional image data. As a result, it is possible for a three-dimensional image to which a special effect has been applied to appear natural and not strange, and it is possible to create 3-D image data without increasing processing time and required memory.

With each of the embodiments of the present invention, 3-D shooting mode and special effect (art filter) are set on menu screens, but this setting is not limited to setting screens such as menu screens, and it is also possible to provide dedicated buttons and to perform setting by operating the dedicated buttons. Also two images have been used for 3-D image creation, but it is also possible to use three or more images. Also, processing for still images in the above embodiments can also be carried out for movies and live view.

Also, for this embodiment description has been given using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any case, it is possible to apply the present invention as long as it is a device for image processing to create a three-dimensional image depicting a special effect for a plurality of parallax images.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing device for visually applying a special effect by subjecting raw data that has been acquired by imaging to image processing, and creating image data that is capable of being viewed stereoscopically, comprising:
    a tone conversion section for tone converting the raw data,
    a three-dimensional image data processing section for carrying out at least one of clipping image data that has been tone converted by the tone conversion section as image data to be viewed stereoscopically, or carrying out geometric processing, to create three-dimensional image data, and
    a special effect image processing section for subjecting the three-dimensional image data created by the three-dimensional image data processing section to special image processing to apply a special effect that is analogous to an image that has been formed optically or a special effect that is analogous to an image formed by photographic film or by development and printing processing, and creating a three-dimensional special-effect image;
    wherein the special image processing is at least one selected from the group consisting of cross filter processing, soft focus processing, noise addition processing, shading processing, peripheral brightening processing, and miniature effect processing; and
    the special effect image processing section carries out the special image processing on each image data, among a plurality of image data for creating the three-dimensional image data, on the basis of an image data position corresponding to a specified position of one image data that is made a reference, and the position of the image data is within a specified range from a position of a subject image of the reference image data corresponding to the specified position.

2. The image processing device of claim 1, wherein the special effect image processing section carries out different image processing depending on coordinate position of the image data, or combines image data for which different image processing has been carried out for adjacent pixels.

3. The image processing device of claim 1, further comprising an image processing parameter storage section for storing a first image processing parameter for determining image processing content for the tone conversion section, and a second image processing parameter for special image processing, that is different to the first image processing parameter, for determining image processing content of the tone conversion section, wherein:
   processing content carried out by the three-dimensional image data processing section, using an image that has been subjected to image processing in the tone processing section, is determined using the first image processing parameter;
   image processing using the special effect is carried out using the second image processing parameter; and
   a three-dimensional image is created for an image that has been subjected to image processing, using the special effect, by the three-dimensional image data processing section.

4. The image processing device of claim 1, where there are two or more sets of RAW data.

5. The image processing device of claim 1, wherein, in the case of creating image data for other than a 3-D special image together with the 3-D image, the tone conversion section, besides tone conversion, carries out processing to tone convert RAW data corresponding to a created image other than a stereoscopic special image effect, besides tone conversion.

6. The image processing device of claim 1 further comprising a storage section for storing three-dimensional image data that has been processed by the special effect image processing section, wherein the storage section stores data for defining processing that was carried out when three-dimensional image data was created.

7. The image processing device of claim 1 further comprising a multi-recording section for storing a plurality of image data, for storing at least two of a normal two-dimensional image, a 3-D image, and a 3-D image to which a special effect has been applied.

8. The image processing device of claim 1, wherein:
   the tone conversion section tone converts two pieces of the raw data that have been acquired by shooting the same subject with parallax, and
   the three-dimensional image data processing section clips two pieces of the image data that have been tone converted by the tone conversion section as image data to be viewed stereoscopically.

9. The image processing device of claim 1, wherein an optical filter is used to form the special effect that is analogous to the image that has been formed optically.

10. The image processing device of claim 1, wherein the special image processing to apply the special effect that is analogous to the image that has been formed optically is cross filter processing, soft focus processing, noise addition processing, shading processing, peripheral brightening processing, or miniature effect processing.

11. The image processing device of claim 1, wherein the special image processing to apply the special effect that is analogous to the image formed by photographic film or by development and printing processing is noise addition processing, soft focus processing, or shading processing.

12. An image processing method for visually expressing a special effect by subjecting raw data that has been acquired by imaging to image processing, and creating image data that is capable of being viewed stereoscopically, comprising:
   tone converting the raw data;
   carrying out at least one of clipping image data that has been tone converted by the tone conversion section as image data to be viewed stereoscopically, or geometric processing, and creating three dimensional image data; and
   subjecting the three-dimensional image data to special image processing to apply a special effect that is analogous to an image that has been formed optically or a special effect that is analogous to an image formed by photographic film or by development and printing processing, and creating a three-dimensional special-effect image;
   wherein the special image processing is at least one selected from the group consisting of cross filter processing, soft focus processing, noise addition processing, shading processing, peripheral brightening processing, and miniature effect processing; and
   the special effect image processing carries out the special image processing on each image data, among a plurality of image data for creating the three-dimensional image data, on the basis of an image data position corresponding to a specified position of one image data that is made a reference, and the position of the image data is within a specified range from a position of a subject image of the reference image data corresponding to the specified position.

13. The image processing method of claim 12, wherein, prior to image processing of the RAW data corresponding to the special effect, noise reduction processing is carried out after executing edge enhancement processing.

14. The image processing method of claim 12, wherein:
   two pieces of the raw data that have been acquired by shooting the same subject with parallax are tone converted, and
   two pieces of the image data that have been tone converted by the tone conversion section as image data to be viewed stereoscopically are clipped.

15. A non-transitory computer readable storage medium storing a three-dimensional image processing program for execution on a computer, for visually expressing a special effect by subjecting raw data that has been acquired by imaging to image processing, and creating image data that is capable of being viewed stereoscopically, the program comprising:
   tone converting the raw data;
   carrying out at least one of clipping image data that has been tone converted by the tone conversion section as image data to be viewed stereoscopically, or geometric processing, and creating three dimensional image data; and
   subjecting the three-dimensional image data to special image processing to apply a special effect that is analogous to an image that has been formed optically or a special effect that is analogous to an image formed by photographic film or by development and printing processing, and creating a three-dimensional special-effect image;
   wherein the special image processing is at least one selected from the group consisting of cross filter processing, soft focus processing, noise addition processing, shading processing, peripheral brightening processing, and miniature effect processing; and
   the special effect image processing carries out the special image processing on each image data, among a plurality of image data for creating the three-dimensional image data, on the basis of an image data position corresponding to a specified position of one image data that is made a reference, and the position of the image data is within a specified range from a position of a subject image of the reference image data corresponding to the specified position.

16. The non-transitory computer readable storage medium of claim 15, wherein:
two pieces of the raw data that have been acquired by shooting the same subject with parallax are tone converted, and
two pieces of the image data that have been tone converted by the tone conversion section as image data to be viewed stereoscopically are clipped.

* * * * *